(12) United States Patent
Grossman

(10) Patent No.: US 10,435,155 B2
(45) Date of Patent: Oct. 8, 2019

(54) RAPID STORE LOAD SYSTEM FOR AIRCRAFT AND METHOD OF OPERATION THEREOF

(71) Applicant: Victor A Grossman, Staten Island, NY (US)

(72) Inventor: Victor A. Grossman, Staten Island, NY (US)

(*) Notice: Subject to any disclaimer, the term of this patent is extended or adjusted under 35 U.S.C. 154(b) by 0 days.

(21) Appl. No.: 16/195,841

(22) Filed: Nov. 19, 2018

(65) Prior Publication Data

US 2019/0084680 A1 Mar. 21, 2019

Related U.S. Application Data

(63) Continuation of application No. 15/419,011, filed on Jan. 30, 2017, now Pat. No. 10,131,430, which is a continuation of application No. 14/828,343, filed on Aug. 17, 2015, now Pat. No. 9,555,887, which is a continuation of application No. 13/649,266, filed on Oct. 11, 2012, now Pat. No. 9,108,730.

(60) Provisional application No. 61/545,658, filed on Oct. 11, 2011.

(51) Int. Cl.

| B64D 7/00 | (2006.01) |
|---|---|
| B64D 37/00 | (2006.01) |
| B64F 5/00 | (2017.01) |
| B64F 1/22 | (2006.01) |
| B64F 1/28 | (2006.01) |
| F41A 9/87 | (2006.01) |
| B64F 5/60 | (2017.01) |
| B64F 5/50 | (2017.01) |
| B63B 35/50 | (2006.01) |
| B64D 37/04 | (2006.01) |

(52) U.S. Cl.
CPC ............... *B64D 7/00* (2013.01); *B63B 35/50* (2013.01); *B64D 37/00* (2013.01); *B64D 37/04* (2013.01); *B64F 1/22* (2013.01); *B64F 1/28* (2013.01); *B64F 5/00* (2013.01); *B64F 5/50* (2017.01); *B64F 5/60* (2017.01); *F41A 9/87* (2013.01); *Y02T 50/44* (2013.01)

(58) Field of Classification Search
CPC ...... F41A 9/87; B64F 1/28; B64F 1/22; B64F 5/00; B64D 37/00; B64D 7/00
See application file for complete search history.

(56) References Cited

U.S. PATENT DOCUMENTS

| 3,911,786 A * | 10/1975 | Scheetz | B64D 7/00 244/137.4 |
|---|---|---|---|
| 4,325,317 A * | 4/1982 | Wilford | B63G 11/00 114/261 |
| 2007/0114280 A1* | 5/2007 | Coop | G06Q 50/30 235/385 |
| 2010/0097183 A1* | 4/2010 | Pollema | G05D 3/12 340/10.1 |

* cited by examiner

*Primary Examiner* — Brian M O'Hara
*Assistant Examiner* — Michael B. Kreiner

(57) ABSTRACT

A method to load stores on an aircraft, the method may be controlled by one or more controller and may include one or more acts of loading stores onto corresponding lift portions; determining a relative position of the aircraft; positioning the stores relative to the determined position of the aircraft; and securing the stores to corresponding hardpoints (HPs) of the aircraft.

20 Claims, 18 Drawing Sheets

RAPID STORE LOAD SYSTEM FOR AIRCRAFT AND METHOD OF OPERATION THEREOF

REFERENCE TO PRIORITY APPLICATIONS

This application claims priority to U.S. patent application Ser. No. 15/419,011, filed on Jan. 30, 2017, now U.S. Pat. No. 10,131,430, and entitled "RAPID STORE LOAD SYSTEM FOR AIRCRAFT AND METHOD OF OPERATION THEREOF," which is a continuation of U.S. patent application Ser. No. 14/828,343, filed on Aug. 17, 2015, now U.S. Pat. No. 9,555,887, and entitled "RAPID STORE LOAD SYSTEM FOR AIRCRAFT AND METHOD OF OPERATION THEREOF," which is a continuation of U.S. patent application Ser. No. 13/649,266, filed on Oct. 11, 2012, now U.S. Pat. No. 9,108,730, and entitled "RAPID STORE LOAD SYSTEM FOR AIRCRAFT AND METHOD OF OPERATION THEREOF," which is a continuation of U.S. Provisional Patent Application Ser. No. 61/545,658, filed on Oct. 11, 2011, and entitled "RAPID STORE LOAD SYSTEM FOR AIRCRAFT AND METHOD OF OPERATION THEREOF," the contents of each of which are incorporated herein by reference in their entirety.

FIELD OF THE INVENTION

The present invention relates generally to an aircraft store loading system and more particularly to an aircraft loading system for simultaneously loading stores on multiple hardpoints.

BACKGROUND OF THE INVENTION

Typically, aircraft such as military aircraft include hardpoints (HPs) which hold stores such as fuel tanks, baggage pods, imaging equipment electronics (e.g., electronic countermeasure devices, etc.), munitions, projectiles (e.g., research equipment, rockets, etc.), missiles, bombs, guns, etc., some of which may be dispensed (e.g., rockets, missiles, etc.) or jettisoned during flight (e.g., fuel tanks, flares, chaff, etc.). Typically, HPs can include pylons, launchers, and/or rack units (RUs), ejector rack units (ERUs), bomb rack units (BRUs), ejectors, etc., to which the stores may be attached and are typically situated externally (e.g., under a wing, on a wing tip, etc.) or internally (e.g., in an internal bay, etc.). During a process known as an integrated combat turn (ICT) which is also known as an integrated combat turnaround, a combat aircraft is loaded with stores and is fueled between sorties by a ground crew which typically takes about twenty minutes. This operation requires the ground crew to manually attach the stores to the HPs and is time consuming and prone to error especially during a time of urgency.

SUMMARY OF THE INVENTION

According to an aspect of the present system there is disclosed a system, method, apparatus, computer program, (hereinafter each of which will be referred to as a system unless the context indicates otherwise) to load stores and/or refuel an aircraft so as to reduce an integrated combat turnaround (or turn) (ICT) time.

Therefore, it is an aspect of the present system to provide a method to load stores on an aircraft, the method controlled by a controller, the method may include acts of loading stores onto corresponding lift portions; determining a relative position of the aircraft; positioning the stores relative to the determined position of the aircraft; and securing the stores to corresponding hardpoints (HPs) of the aircraft. The method may further include an act of selecting the stores to load unto the corresponding lift portions in accordance with an identification (ID) of the aircraft. The method may further include an act of determining a configuration of the aircraft. Moreover, in accordance with the method, the configuration of the aircraft may include information related to one or more of aircraft type, aircraft identification (ID), selected stores, flight data link (FDL), hardpoint configuration, rack unit (RU) specification, (RU) placement, pylon information, launcher-information, hardpoint position relative to the aircraft, selected store information for corresponding RUs. Further, in accordance with the method the act of securing is performed in accordance with a corresponding type of hardpoint of the aircraft. Moreover, the act of positioning the stores may include positioning stores for a plurality of hardpoints simultaneously. Moreover, the method may include an act of determining whether the aircraft has sustained damage and informing of the determination.

In accordance with another aspect of the present system, there is disclosed a system to load stores on an aircraft, the system may include at least one controller which may simultaneously load stores onto corresponding lift portions; determine a relative position of the aircraft; position the stores relative to the determined position of the aircraft; and/or may secure the stores to corresponding hardpoints (HPs) of the aircraft. Further, the at least one controller may select stores to load unto the corresponding lift portions in accordance with an identification (ID) of the aircraft. Further, it is envisioned that the at least one controller may determine a configuration of the aircraft. Moreover, the configuration of the aircraft may information related to one or more of aircraft type, aircraft identification (ID), selected stores, flight data link (FDL), hardpoint configuration, rack unit (RU) specification, (RU) placement, pylon information, launcher information, hardpoint position relative to the aircraft, selected store information for corresponding RUs, and the at least one controller controls lift portions to position or secure the stores in accordance with the configuration of the aircraft. Further, the at least one controller may secure the stores to the aircraft in accordance with a corresponding type of hardpoint of the aircraft. Further, the at least one controller may lift portions to position a plurality of stores for a plurality of hardpoints simultaneously. Moreover, the at least one controller determines whether the aircraft has sustained damage.

In accordance with yet another aspect of the present system, there is disclosed a ship including: a flight deck to receive an aircraft; and a store loading system having at least one controller which controls to: load stores onto corresponding lift portions; determine a relative position of the aircraft; position the stores relative to the determined position of the aircraft; and secure the stores to corresponding hardpoints (HPs) of the aircraft.

Accordingly, the present system may provide an integrated combat turnaround technique in which services such as munitions loading, fuel servicing, loading of chaff, flares, etc., and/or a turnaround inspection of the aircraft may be provided in a serial and/or parallel (e.g., consecutive and/or synchronous, respectively) manner.

In accordance with yet another aspect of the present system, there is provides a method to load stores on an aircraft using plurality of lift portions, the method controlled by a controller, the method may include one or more acts of: receiving the stores at corresponding lift portions of the plurality of lift portions; determining positions of each of a of plurality of hardpoints (HPs) of the aircraft; controlling corresponding lift portions to position the received stores relative to corresponding HPs of the plurality of HPs of the aircraft; and securing the stores to corresponding HPs of the plurality of HPs. The method may further include an act of selecting the stores to be received by the corresponding lift portions in accordance with one or more of an identification (ID) of the aircraft and an identification of the stores, wherein the act of selecting the stores may further include acts of determining a configuration of the aircraft; and/or controlling one or more of the lift portions in accordance with the determined configuration of the aircraft.

Further, the configuration of the aircraft may include information related to one or more of aircraft type, aircraft identification (ID), aircraft block number, selected stores, flight data link (FDL) type, hardpoint configuration, HP type, HP location, HP rack unit (RU), RU location, pylon information, launcher information. Further, the act of securing the stores may include attaching the stores to corresponding HPs of the plurality of HPs in accordance with a type of the corresponding HP of the plurality of HPs. Moreover, the act of controlling the corresponding lift portions may include controlling a plurality of corresponding lift portions simultaneously. Further, the method may include an act of controlling one or more of the lift portions to provide fuel to the aircraft or to provide energy to the aircraft. Moreover, the method may include an act of determining whether the aircraft has sustained damage (e.g., by obtaining electronic information from, for example on board diagnostics of the aircraft and/or by inspecting the aircraft (e.g., using imaging methods, etc.). For example, the method may obtain image information related to the aircraft and compare this information with previously stored image information. Accordingly, if it is determined that the image information obtained by the system does not match the previously stored image information, the method may determine that the aircraft has sustained damage. Further, the method may render information related to this determination (e.g., "aircraft sustained damage to starboard wing and at #1 spoiler") for the convenience of a user.

In accordance with yet another aspect of the present system, there is disclosed a system to load stores on an aircraft, the system may include a plurality of lift portions; and at least one controller which may be configured to: receive stores at corresponding lift portions of the plurality of lift portions; determine positions of one or more hardpoints (HPs) of a plurality of HPs of the aircraft; control corresponding lift portions to position the received stores relative to corresponding HPs of the plurality of HPs of the aircraft; and secure the stores to corresponding HPs of the plurality of HPs. Further, the at least one controller may be further configured to select stores to be received by the corresponding lift portions in accordance with an identification (ID) of the aircraft and an identification of the stores.

Further, the at least one controller may be configured to determine a configuration of the aircraft; and control one or more lift portions the stores in accordance with the determined configuration of the aircraft. Moreover, the configuration of the aircraft may include information related to one or more of aircraft type, aircraft identification (ID), aircraft block number, selected stores, flight data link (FDL) type, hardpoint configuration, HP type; HP location, HP rack unit (RU), RU location, pylon information, launcher information. Further, the at least one controller may be configured to control one or more of the lift portions to secure corresponding stores to corresponding HPs of the aircraft. It is also envisioned that the at least one controller may be configured to control a plurality of lift portions simultaneously. Further, the at least one controller may be configured to determine whether the aircraft has sustained damage. Moreover, the at least one controller may be configured to control at least one of the lift portions to arm a corresponding store.

In accordance with yet another aspect of the present system, there is disclosed a marine vessel such as a ship which may include a flight deck to receive an aircraft; and a store loading system including: a plurality of lift portions at least one of which may be configured to receive corresponding stores; and a controller which may be configured to: determine positions of each of a of plurality of hardpoints (HPs) of the aircraft, control corresponding lift portions to position the received stores relative to corresponding HPs of the plurality of HPs of the aircraft, and secure the stores to corresponding HPs of the plurality of HPs. It is further envisioned that the store loading system may be further configured to provide fuel or energy to the aircraft. Moreover, the store loading system may be further configured to arm the secured stores. Further it is envisioned that the controller may be configured to select stores to be received by the corresponding lift portions in accordance with an identification (ID) of the aircraft and an identification of the stores.

BRIEF DESCRIPTION OF THE DRAWINGS

The invention is herein described, by way of example only, with reference to the accompanying drawings, wherein.

DETAILED DESCRIPTION OF THE INVENTION

Preferred embodiments of the present invention will now be described in detail with reference to the drawings. For the sake of clarity, certain features of the invention will not be discussed when they would be apparent to those with skill in the art.

As used herein, the term hardpoints may refer to any interface such as a standardized interface of an aircraft to which a load portion such as a store (or stores) may be attached. Accordingly, hardpoints may refer to any part of an airframe of an aircraft (e.g., a winged aircraft, a helicopter, ground effect vehicle (e.g., a hovercraft, an ekranoplan, etc.), etc.) which may carry an external, internal load, or combination thereof. For example, a hardpoint may refer to any part of a wing or fuselage of an aircraft where stores (e.g., external or internal) such as bombs, missiles, fuel tanks, countermeasures, gun pods, drop tanks, imaging devices, etc., can be mounted to an interface configured to receive the corresponding store or stores. Further, hardpoints may include pylons, racks, ejector racks, rack units (RUs), bomb rack units (BRUs), braces, rail-type launchers, ejector launchers, etc. Further, the hardpoints may include an interface which may enable communication between the aircraft and a corresponding store. However, it is also envisioned that an aircraft may communicate with a corresponding store using other wired and/or wireless communication methods using a suitable communication protocol.

The term rendering and formatives thereof as utilized herein refer to providing content, such as digital media, such that it may be perceived by at least one user sense, such as a sense of sight and/or a sense of hearing. For example, the present system may render a user interface (UI) on a display device so that it may be seen and interacted with by a user. Further, the present system may render audio visual content on both of a device that renders audible output (e.g., a speaker, such as a loudspeaker) and a device that renders visual output (e.g., a display). To simplify, the following discussion, the term content and formatives thereof will be utilized and should be understood to include audio content, visual content, audio visual content, textual content and/or other content types, unless a particular content type is specifically intended, as may be readily appreciated. For example, audio content may include voice communication of a pilot of an aircraft, a ground crew member, etc.

Figure 1:
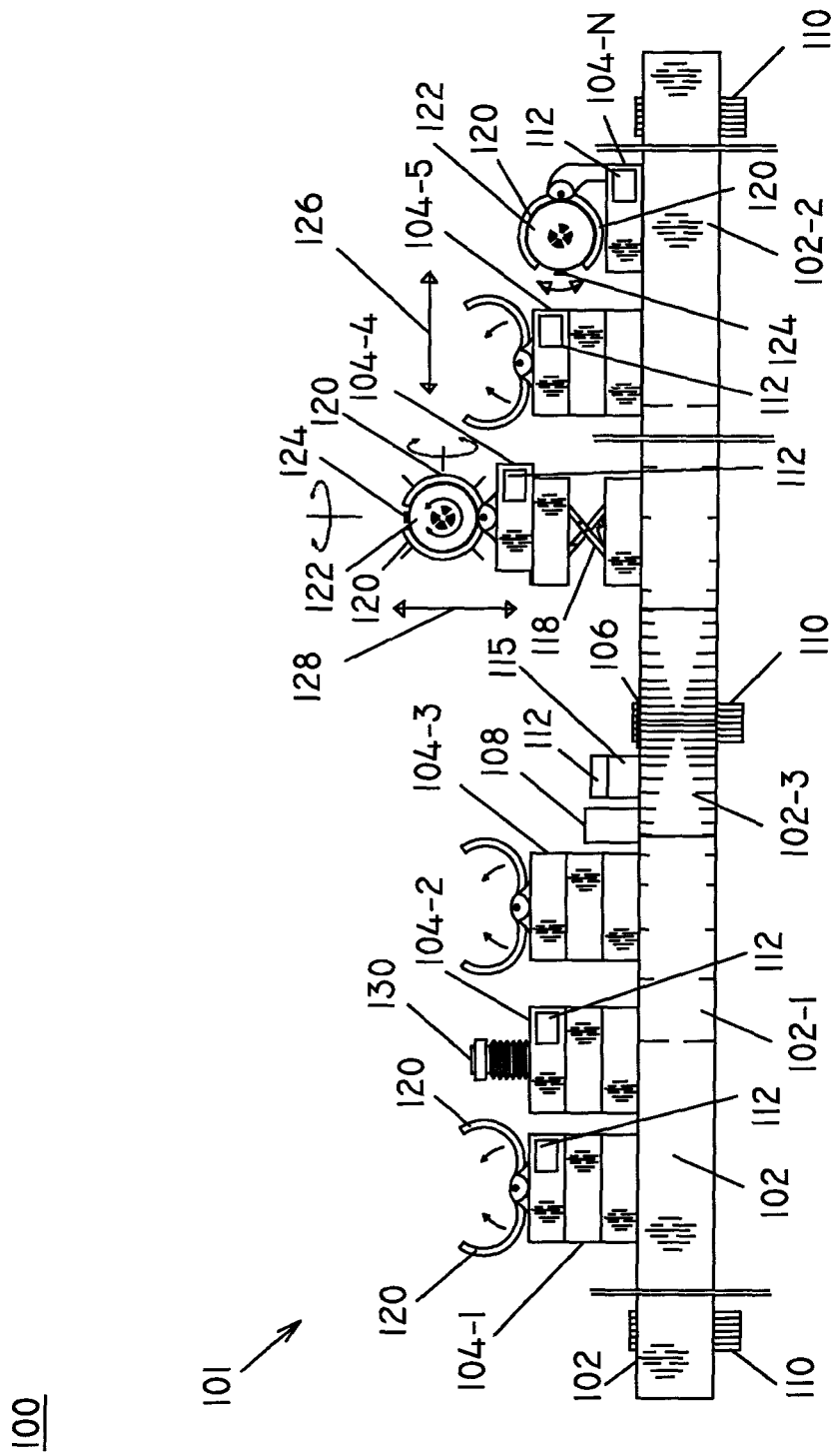
FIG. 1 is front schematic view of a system according to an embodiment of the present system.

FIG. 1 is front schematic view of a system 100 according to an embodiment of the present system. The system 100 may include a station 101 having one or more of: a base portion 102, lift portions 104-2-104-N, sensor portions 112, a control portion (e.g., see, 106 FIG. 2), and an interface portion 108 one or more of which may be located locally and/or remotely to each other. For example, the control portion 106, or portions thereof, may be located remotely from the other portions (e.g., 102-104 and 108) and may communicate with one or more of these portions via a wired and/or wireless communication method (e.g., a network, a cable, radio frequency (RF), etc.) using any suitable communication protocol(s). The system may include a plurality of stations 101 under the control of a control portion and which may communicate over a network.

The control portion 106 may control the overall operation of the system 100 and may include one or more processing portions (e.g., processors, etc.), application specific integrated circuits (ASICs), computational devices (e.g., computers, etc.), logic devices, programmable logic arrays (PLAs), neural processors, etc. which may receive information, process the information, and/or output information to control the system 100 in accordance with, for example, one or more processes of the present system 100.

The sensor portions 112 may include one or more sensors which may provide information to the control portion 106 and may include, for example, one or more of mechanical, electrical, electro-mechanical, and/or optical sensors. For example, the sensors may include proximity (e.g., infra-red sensors, Kinect™ type sensors, etc.), imaging, position, contact, doppler sensors, magnetic, gravity, voltage, current, temperature, pressure, airflow, and/or other types of sensors, which may provide corresponding information to the control portion 106 for processing. The sensors may provide sensed information to the control portion 106 which may process the sensed information and may determine for example, absolute location, relative location, geophysical location or orientation, velocity, speed, voltage, current temperature, distance, pressure, force, airflow, orientation (e.g., relative to one or more axes, etc.), radio-frequency ID (RFID); identification, etc. For example, sensor information from, for example, position sensors (e.g., laser, infra-red, ultrasound, and/or doppler sensors) may be used to position the base portion 102 (or parts thereof) and/or an aircraft (or parts thereof such as hardpoints) to be serviced relative to each other. Then, sensor information obtained from sensors of the systems such as optical sensors, magnetic sensors, proximity sensors (e.g., Microsoft™ Kinect™, Kinect™ type sensors, etc.), etc. may be used to aid in the positioning and/or attachment of stores to desired HPs of the aircraft. The HPs may include external HPs and/or internal HPs (IHPs). The sensors may include temperature and/or pressure sensors mounted in proximity to a desired portion of an aircraft so as to determine temperature of various components of the aircraft. For example, the sensors 112 may include a forward landing gear temperature sensor Tsensfwd which may sense brake temperature of the forward landing gear of the aircraft. Similarly, one or more temperature sensors may be provided to sense temperature of each brake of the aircraft and/or to transmit this information to the control portion 106 for further processing. Accordingly, for example, upon determining that the Tsensfwd may be greater than or equal to a threshold temperature, the system 100 may activate a fan to provide a flow of coolant (e.g., air, etc.) and/or may position a vent (such as an air port or air vent) to direct the flow of coolant at the forward landing gear to cool it and prevent overheating of the forward landing gear and/or nearby components. The sensors 112 may communicate with the control portion 106 using a wired and/or wireless communication methods. Further, the sensors 112 may include identifying code when communicating with the control portion 106 such that the control portion 106 may identify individual sensors 112 and/or may associate information received with the corresponding the sensor 112.

The base portion 102 may be shaped and/or sized so that it may fit a desired aircraft and/or loading method. For example, to position the base portion 102 relative to an aircraft from the front of the aircraft, the base portion 102 may include a "Y" or similar configuration such that it may fit about a nose wheel (or other components or wheel(s)) of the aircraft as will be shown and discussed below. However, other shapes are also envisioned. For example, the base portion may be square, "X," "U," "H," "T," "Z" shaped etc., as desired based upon various design constraints such as service aircraft shape, size, configuration, loading methods, operation space, etc.

The base portion 102 may include one or more portions such as base portions 102-1 and 102-2 (generally 102-x) to which the lift portions 104 may be attached. Although separate portions 102-1 and 102-2 are shown, it is envisioned that they may continuous and/or may be formed integrally with each other.

To provide mobility, the base portion 102 may include a mobility portions such as wheels 110, rollers, rails, tracks, floatation devices (e.g., pneumatic floatation, etc.) to enable the base portion 102 to be easily and conveniently moved into a desired position relative to, for example, an aircraft to be serviced. However, it is also envisioned that the base portion 102 or parts thereof may be fixedly mounted in desired position relative to a service area or pad, a store loading area or pad, a desired geophysical area, etc., which may be fixed in position or may be mobile (e.g., a turntable). Moreover, it is envisioned that the base portion 102 may include outriggers which may stabilize the base portion 100 during operation and which may be manually and/or automatically operated. The outriggers may include a surface contact area such as a pad, or may include a mobility portion such as casters, tracks, etc. It is further envisioned that the base portion may be attached to a service vehicle such as an aircraft tug or a truck.

Although a tricycle wheel configuration is shown, other configurations (e.g., two, four, five, six, etc.) are also envisioned. Accordingly, in yet other embodiments, the number of wheels and/or axles may be different from those shown in FIG. 1. Further, in yet other embodiments, it is envisioned that stabilization devices such as gyroscopes may be incorporated to stabilize the system or portions thereof. Further, in yet other embodiments it is envisioned that the system may include dragbars to position the system into a desired location and/or orientation.

Further, it is envisioned that the system 100 may include tracks (which may be steerable) or other mobility portions to provide mobility over a desired terrain. Moreover, it is envisioned that the present system may include a suspension system to enable portions of the base portion 102 to be lifted (e.g., to increase ground clearance, to level, etc.) relative to the mobility portions (e.g. the wheels 110, tracks, etc.). Accordingly, the suspension system may include actuators (e.g., biasing members, hydraulic lifts, etc.) which may operate under the control of the control portion 106.

A drive portion may be coupled to one or more of the wheels 110 to provide a motive force and/or a resistive force (e.g., a braking force) to drive the corresponding wheel 110 in a desired rotational direction (e.g., forward or reverse) or to brake or lock the wheel (e.g., to prevent or reduce rotational motion), respectively, in accordance with controls from the control portion. The drive portion may include, for example, a motor (e.g., an electric motor such as an alternating current (AC), direct current (DC), or stepper motor) a hydraulic motor, a pneumatic motor, an engine (e.g., an internal combustion engine, a turbine engine, etc.), braking actuators, etc. The drive portion may receive an energy supply which may be provided from a local source (e.g., a fuel tank, batteries, a compressed air tank, capacitors, a fuel cell, hydraulic pressure, etc.) or from an external link (e.g., hydraulic fluid, compressed air, an AC or DC hardwired link, etc.) which may be coupled to an interface such as the interface 108. The drive portions may be internally mounted in a hub of one or more of the wheels 110 and may be individually controlled by the controller 106.

The lift portions 104 may include one or more lift portions 104-2 through 104-N (generally 104-x) which may position and/or hold stores for attaching to corresponding HPs of the aircraft. The lift portions 104-x include one or more positioning mechanisms which may position and/or otherwise manipulate corresponding stores (in one or more patterns) attached thereto in one more axes so that each store (e.g., 122) may be attached to a corresponding hardpoint. Accordingly, some lift portions 104-x may include, for example, multi-axis manipulation device such as a seven-axis lift (e.g., using a seven-axis robotic arm which may provide, for example, seven degrees of freedom) to hold, lift, rotate stores, and/or otherwise manipulate stores such that the stores may be attached to or to a corresponding hardpoint. However, depending upon the type of stores, aircraft configuration, etc., other types of positioning mechanisms such as scissor, linear or non-linear (e.g., rail type, etc.), parallel or non-parallel arm, short-long arm (SLA), wishbone, pivoting arm (e.g. multiple pivoting arms), rotational, and/or other types of linkages and/or combinations thereof may also be provided. The lift portions 104-x may include transducers (e.g., actuators, motors, etc.) which may be controlled by the controller 106, and may provide feedback information (e.g., from one or more sensors such as tactile sensors, position sensors (e.g., rotational position sensors, linear position sensors, etc.), pressure sensors, engagement sensors, optical sensors, laser scanners, etc.) so that the control portion 106 may accurately control the lift portions 104-x to position and/or attach corresponding stores to hardpoints of the aircraft. For example, lift portions 104-1 104-3, 104-4 and 104-5 may include one or more of a lift portion such as a scissor type lift portion which may include a scissor arrangement 118 to lift a store in a first axis (e.g., a y axis), a rotational portion (e.g., to rotate the store rotating about one or more axes), linear portions which may linearly move portions of the lift portions 104-a along an axis (e.g., x and/or z axes) which may be controlled by the control portion 106. The scissor arrangement 118 may include symmetric and/or asymmetric lift portions which may extend symmetrically and/or asymmetrically, respectively. The lift portions 104-x may secure stores 122 during operation (e.g., prior to attachment to a hardpoint of an aircraft) using any suitable method such as a cradle (or cradles), a vacuum portion, a gripping portion, a clamping portion, etc. Accordingly, for the sake of clarity, lift portions 104-1 104-3, 104-4 and 104-5 may include suitable clamping or grasping mechanism (e.g., a terminal manipulator, an end effector, etc.) (e.g., having a linear and/or rotational gripping member), etc., such as clamping portion 120, which may firmly hold corresponding stores while the stores 122 are handled, moved, manipulated, and/or attached to the HPs of the aircraft, etc. The lift portions 104-x may manipulate the stores so as to place them in a desired position or positions 122 (e.g., having an x, y, z, coordinate, etc.) so as to secure, for example, lugs 124 of the stores 122 to portions (e.g., brackets of rack units, etc.) of corresponding hardpoints of the aircraft. The lift portions 104-x may include suitable actuators such as electric, hydraulic, and/or pneumatic motors, piezo-electric actuators, electro-active actuators (EAP), carbon nanotube actuators, hydraulic actuators, pneumatic actuators, etc. It is envisioned that each lift portion 104-x may include a plurality of grasping mechanisms.

It is further envisioned that each lift portion 104-*x* may include its own proprietary control portion (e.g. 106-*x*) which may control the operation of the corresponding lift portion 104-*x* and may be coupled to the control portion 106 to communicate with the control portion 106 and/or each other so as to send/receive various information such as sensor information, commands, (start, stop, etc.), etc. However, for the sake of clarity, it will be assumed that the control portion 106 includes control portions 106-*x*.

The position and/or orientation of one or more of the lift portions 104-*x* may be changed relative to a corresponding base portion 102-*x* using any suitable arrangement. Accordingly, the lift portions 104-*x* may be repositionable (e.g., manually and/or automatically under the control of the control portion 106) along a transverse axis of the body portion 102 as indicated by arrow 126. This movement may be controlled by the control portion 106 (via transducers such as actuators (e.g., motors, etc.)) and/or by a user. Accordingly, the system 100 may be configured for a desired aircraft, aircraft configuration, aircraft, type, and/or store-type (e.g., missiles, auxiliary fuel tanks, etc.) by changing (e.g., swapping) lift portions 104-*x* and/or by changing the location of lift portions 104-*x* relative to a corresponding base portion 102-*x* and/or each other, to suit a desired aircraft, aircraft type, aircraft configuration, and/or store-type. Thus, for an aircraft with three wing hardpoints separated by an on-center distance of about D on each wing, three lift portions 104-*x* may be attached to each corresponding main portion 102-*x* and may be separated by an on-center distance of about D. While, for an aircraft having four wing hardpoints separated by an on-center distance of about DD on each wing, four lift portions 104-*x* may be attached to each corresponding main portion 102-*x* and may be separated by an on-center distance of about DD. However, with respect to the distance between lift portions 104-*x*, this distance may depend upon a type of lift portion 104-*x* (e.g., hinged arms, parallel arms, etc.) and it is envisioned that other separation distances may also be used. The control portion 106 may control the lift portions 104-*x* to move along an axis (e.g., 126) to vary these distances in accordance with one or more algorithms of the system 100.

Similarly, the lift portions 104-*x* on one or more sides may be configured to use a linear type lift portion for a first hardpoint, a parallel arm lift portion for another hardpoint, and a multi-axis lift portion for yet another hardpoint, etc. It is also envisioned that lift portions 104-*x* may be fixedly attached (e.g., by welding, bolting, riveting, bonding, etc.) to the body portion 102, if desired. The type of lift portions 104-*x* used may depend upon an aircraft, aircraft type, aircraft configuration, store type (or types), etc. Accordingly, for the sake of clarity, generic lift portions 104-*x* will be described.

Certain lift portions 104-*x* may to provide fluids (such as fuel, oil, water, etc.), gasses (e.g., cooling air, nitrogen, etc.), chemicals (e.g., electrolytes, etc.), power (e.g., electrical, etc.), and/or communication links to an aircraft being serviced. Accordingly, one or more lift portions such as the lift portion 104-2 may include a multi-axis (e.g., seven axis robotic arm) which may couple a fuel lead 130 (e.g., a turret, a refueling portion) to a fuel fill port of the aircraft under the control of the control portion 106. Accordingly, the lift portion 104-2 may include sensors (e.g., optical, ultrasonic, infrared, Kinect™-type sensors, etc.) to provide real-time location information and/or proximity information to the control portion 106 so that the control portion 106 may accurately control the lift portion 104-2 to couple the fuel lead 130 to the aircraft. After the fuel lead 130 is coupled to the fuel fill port of the aircraft, the control portion 106 may be operative to open valves (e.g., fuel flow valves, etc.) to cause fuel to flow from a fuel supply flow-coupled to the fuel lead 130 into one or more fuel reservoirs (e.g., fuel tanks) of the aircraft. The control portion 106 may then monitor fuel flow (e.g., rate, duration, total flow, etc.) so that the aircraft has a desired amount of fuel (e.g., full, or a desired volume, amount (e.g., gallons, liters, etc.) weight (pounds, kg, etc.)) of fuel and may shut (or otherwise control) one or more fuel flow valves and/or may disengage and/or retract the fuel lead 130 once a fuel process (e.g., for the corresponding fuel lead 130) is determined to be completed. The fuel lead 130 may also fuel auxiliary tanks using a suitable flow portion which may engage a fuel port of a corresponding auxiliary tank. Further, additional manipulation portions (e.g., multi-axis manipulation portions) may be included to provide ancillary functions such as to open/closed doors (e.g., fuel doors), vents, caps, attach and/or detach leads (e.g., fuel lead 130), etc. In yet other embodiments, the lift portion 104-2 may include an end manipulator (e.g., an end effector, etc.) to supply chemicals such as an electrolyte and/or to supply energy (e.g., electrical power to energy storage devices such as batteries, capacitors, etc.) to an aircraft being serviced.

The system 100 may include tanks to hold fluids such as oil, fuel, etc., generators or batteries to supply power (e.g., electricity, etc.), fans to supply gasses (e.g., cooling air, etc.) compressors to supply compressed gasses (e.g., nitrogen, air, etc.) and/or fluids (e.g., hydraulic fluid, etc.) to the system 100 and/or an aircraft which is being serviced.

An interface portion 108 may be provided to couple the system 100 to external ports such as fuel, air, electric, fire, and/or data ports. Each port may be coupled to a respective lift portion which may couple a corresponding connector portion to the aircraft so as to supply, for example, cooling air, electricity, and/or communication links, to the aircraft. For example, the data ports may be coupled to data communication links which may transmit and/or receive information to or from the aircraft. For example, the data ports may couple to an aircraft interface such as an aircraft maintenance interface or computer so as to communicate with the aircraft. The fire ports may be coupled to a supply of a fire suppression material (e.g., Halon, foam, water, etc.) which may be provided to a multi-axis fire turret which may disperse the fire suppression material at a desired rate, spread, and/or direction under the control of the control portion 106. The electric port may be coupled to an electrical supply (e.g., AC and/or DC) to power the system 100 and/or the aircraft being serviced. The air port may be coupled to an air supply (e.g., a pressurized air supply) which may be used to supply cooling and/or environmental air to the aircraft under the control of the control portion 106. The fuel port may be flow coupled to an external fuel supply and/or to the fuel lead 130 so as to receive a supply of fuel and/or energy such as jet fuel (e.g., kerosene, etc.), gasoline, hydrogen, an electric charge (e.g., to charge one or more energy storage devices such as capacitors, batteries, etc.), a chemical charge (e.g., an electrolyte, etc.), etc.

The system 100 may further include a power generator such as an engine (e.g., internal combustion or turbine engine), a fuel cell, etc. to supply power and/or a motive force to move and/or otherwise power the system 100 or portions thereof.

Moreover, the system 100 may include a user interface (UI) with which a user may interact with the system 100. UI may be generated on a display and may display information generated by the system 100 for the convenience of a user (e.g., a current status (e.g., "racks 1 through 6 successfully loaded, aircraft refueled," etc.) and/or may receive information input by a user. Further, the system 100 may include mechanical control system such acceleration and brake pedals, a steering wheel, control levers, etc. to manually control one or more functions of the system 100.

Certain lift portions 104-x may further include robotic manipulators to, for example, tighten and/or loosen bolts, covers, etc., engage/disengage bolts, pins, latches, caps, etc., during a loading and/or unloading process, under the control of the control portion 106. For example, lift portion 104-3 may include a multi-axis (e.g., a seven-axis) robotic manipulation portion 142 which may include a manipulator 144 (e.g., see, FIG. 2 e.g., an end effector, terminus, etc.) for inserting and/or tightening bolts or nuts to a specified torque. Similarly, the manipulator 144 may loosen and/or remove nuts and/or bolts, engage or disengage latches, etc. The robotic manipulation portion 142 may be controlled by the control portion 1106 and/or may include one or more sensors to provide sensor information such as location information (e.g., including image information, vision information, etc.) which may be used by the control portion 106 to control the actuators of the robotic portion 142 to perform one or more desired operations (e.g., insert and/or tighten bolt to 100 ft/lbs). As applications and/or mechanisms to control robotic manipulation portions (e.g., seven-axis robotic manipulation portions, etc.) are known in the art, they will not be discussed further for the sake of clarity.

Figure 2:
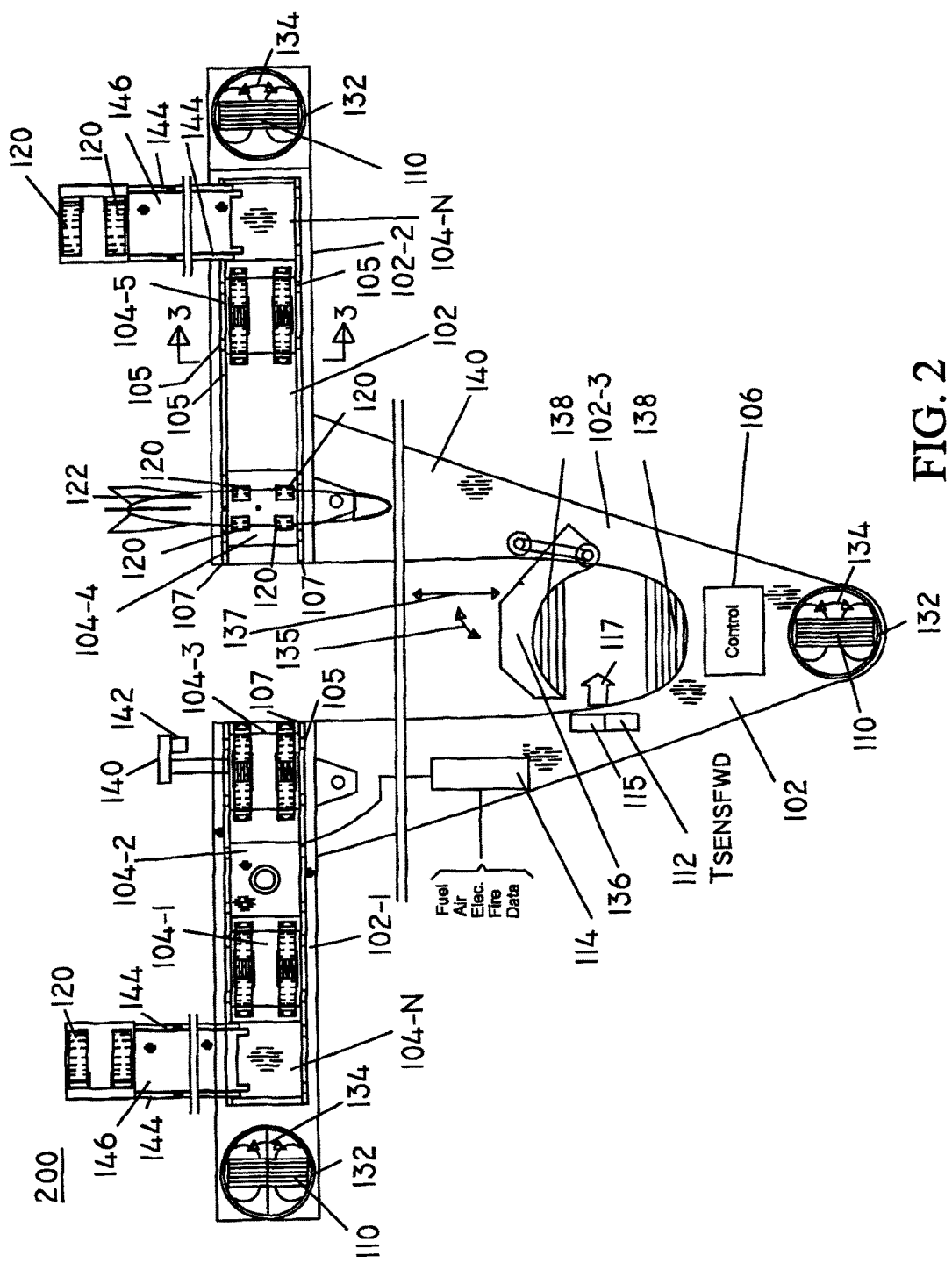
FIG. 2 is top schematic view of a system according to an embodiment of the present system.

FIG. 2 is top schematic view of a system 200 according to an embodiment of the present system. The system 200 is similar to the system 100. However, only a single store 122 is shown set on a single lift portion (e.g., lift portion 104-4). The base portion 102 may include first through third portions 102-1 through 102-3 (generally 102-x). The third base portion 102-3 may couple the first and second base portions 102-1 and 102-2, respectively, to each other. The base portions 102-x may be formed integrally with each other or may be attached to each other using any suitable method such as, for example, bolts, pins, welds, etc. Accordingly, base portions 102-x having different shapes, sizes, etc., may be combined with each other so as to form a base portion suitable for an aircraft type, aircraft configuration, store types, service process (e.g., side access, front access, side loading, etc.), etc.

One or more vents such as air ports 115 may be provided to supply a cooling air flow (as shown by arrow 117) at a desired location of an aircraft such as a brake assembly of an aircraft for cooling the respective brake assembly. Each of the wheels 110 may be steerable under the control of the control portion 106 and/or a user. Accordingly, the wheels 110 may be steered by one or more actuators (e.g., stepper motors, hydraulic actuators, etc.) under the control of the controller using any suitable method such as a forward steer method (e.g., where an axis of a first wheel intersects axes of two other wheels which remain substantially parallel to each other), an Ackermann steer method (e.g., an axis of two wheels turns about an axis of a third wheel), a zero turn radius steer or zero radius turn method (e.g., an axis each of the wheels intersect a turning point or axis) so as to turn about a certain point. The system 100 and/or a user may select a certain steer method. Wheels 110 may be steered about a 360 degree axis (or less) as indicated by arrows 134 and may include an assembly which may be mounted to a corresponding rail 132. Accordingly, the system 100 may be precisely located relative to the aircraft. However, it is also envisioned that one or more wheels 110 may be steered using a mechanical mechanism (e.g., a rack and pinion, recirculating ball, etc.).

One or more of the lift portions 104-x may be movably positioned relative to a corresponding base portion 102-x using a suitable method such as pulleys 105, sliders, friction members, etc., which may be located on tracks 107 or the corresponding base portion 102-x. The pulleys 105 may include gears or cogs which may intermesh with corresponding teeth or cogs, respectively, on the tracks 107 of the base portion 102-x. Further, friction devices, such as brakes, etc., may be used to minimize or entirely prevent motion of the lift portions 104-x relative to the tracks 107 when desired.

The system 100 may further include one or more aircraft wheel restraining and/or lifting devices such as wheel chocks, wheel ramps, wheel cradles, etc. For example, one or more wheel chocks or the like may be provided to chock one or more wheels of an aircraft so as to position the system 200 in a desired position relative to the aircraft. The wheel chocks 138 may include anvil portions 136 one or more of which may swivel as shown by arrow 137 to a locked position to fix a wheel of an aircraft in a desire position (e.g., chock the wheel) and/or may be opened to release the wheel of the aircraft. Further, the anvil portion 136 may be adjusted along a longitudinal axis of the system 200 as shown by arrow 137 to adjust spacing between the wheel chocks 138. Further, the anvil portions may be lowered to further stabilize the apparatus and/or aircraft during store loading operations and/or may be lifted for mobility (e.g., when moving the system 200 and/or an aircraft being serviced).

The lift portions 104-N may include a parallel arm lifting mechanism which may include, for example, parallel arms 144 and 146 which support an anvil 148 of the lift portion 104-N. The parallel arms 144 and/or 146 may be coupled to an actuator (e.g., a hydraulic actuator, a motor, etc.) which may apply a force to the parallel arms 144 and 146 under, for example, the control of the control portion 106.

Figure 3:
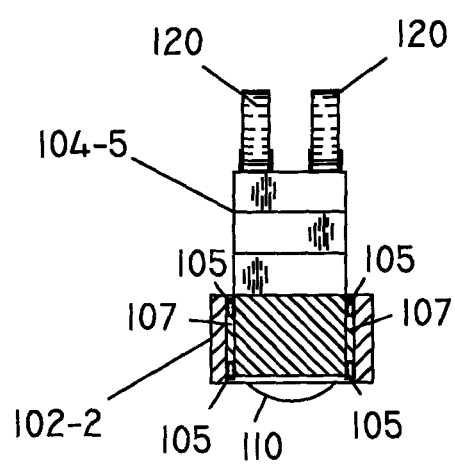
FIG. 3 is a cross-sectional view of a system taken along lines 3-3 of FIG. 2 according to an embodiment of the present apparatus.

FIG. 3 is a cross-sectional view of a system 300 taken along lines 3-3 of FIG. 2 according to an embodiment of the present apparatus. One or more of the lift portions such as the lift portion 104-5 may include pulleys 105 which may engage tracks (or a race) 107 of the base portion 102-2. The pulleys 105 may be powered by actuators (e.g., stepper motors to provide precise control, hydraulic actuators, etc.) under the control of the control portion 106. The pulleys 105 and/or the tracks 107 may include cogs and/or teeth to enable precise positioning of a lift portion 104-x relative to the body portion 102-x . Additionally, a friction portion or other type of brake portion may engage the tracks 107 to prevent undesired movement of the lift portion 104-5 relative to the base portion 102-2. The lift portions 104-x may be removed from, or inserted upon, a base portion 102-x by sliding a corresponding lift portion 104-x across an end 101 of the base portion 104-x. Accordingly, lift portions corresponding with different aircraft types and/or configurations may be employed using common base and/or control portions.

Figure 4:
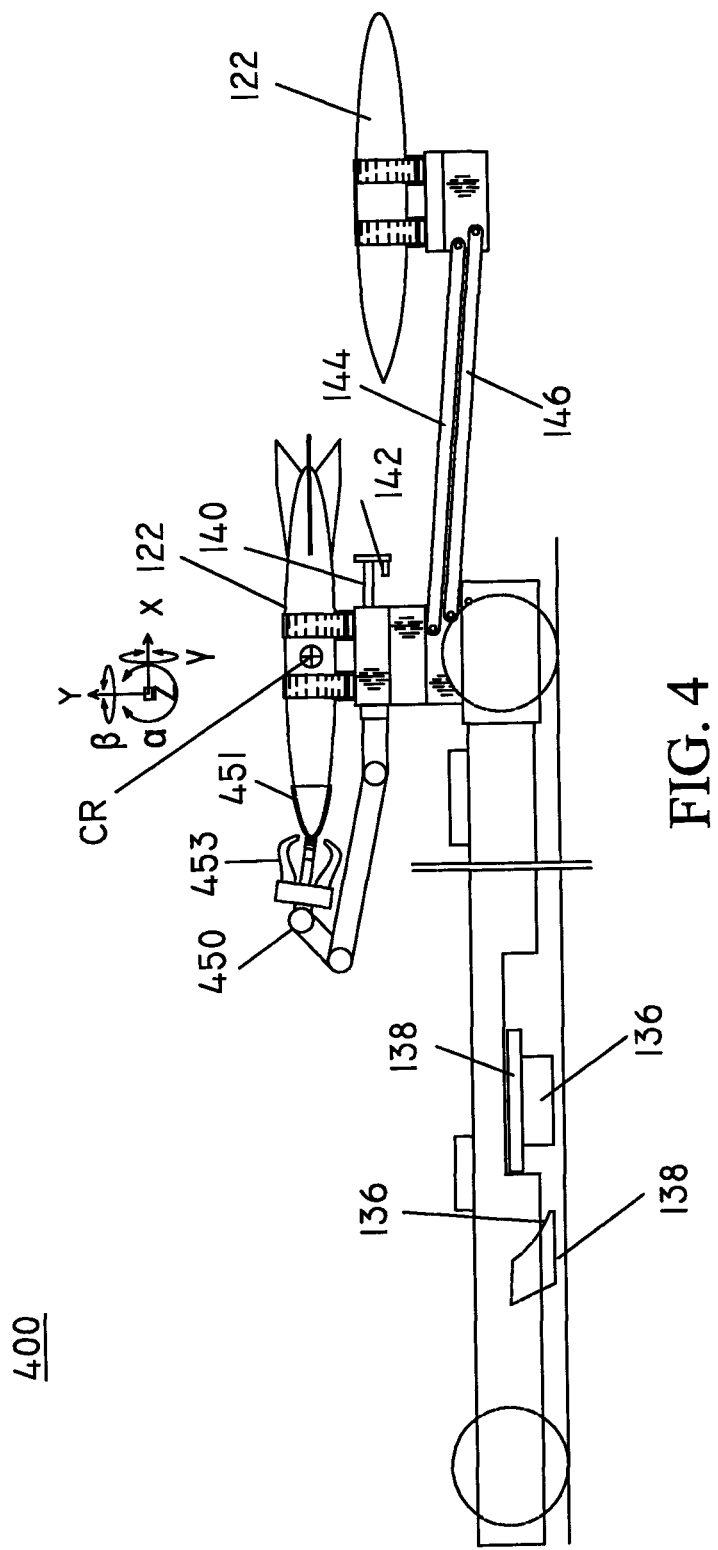
FIG. 4 is side schematic view of a system according to an embodiment of the present system.

FIG. 4 is side schematic view of a system 400 according to an embodiment of the present system. The apparatus 400 is similar to the system 200. However, the anvil portions 136 of the wheel chocks 138 are in a retracted position (e.g., open) and lifted position (e.g., to increase ground clearance) for mobility and the apparatus 400 includes a multi-axis robotic manipulation portion 450 coupled to lift portion 104-5 (or the base portion 402-x). The lift portion 104-5 may manipulate the store 122 such that the store 122 may be correspondingly posited and/or oriented moved with one or more degrees of freedom (e.g., in accordance with a predefined manipulation routine) such as may be illustrated by $(x, y, z, \alpha, \beta, \gamma)$ coordinates and/or other coordinates relative to one or more reference points (e.g., CR) which may correspond with a desired location or area relative to the store 122, a portion of the system 400, and/or the an aircraft being serviced. The multi-axis robotic manipulation portion 450 may be operative to configure various components of the aircraft and/or the store(s) 122 and may include an interface such as a gripping portion 453 to grasp and/or remove, for example, a protective cover 451 of store 122. Accordingly, the gripping portion 453 of the multi-axis robotic manipulation portion 450 may manipulate, set, and/or remove the protective cover 451 of a corresponding store 122 after the store has, for example, been attached to the aircraft by the system 400. Similarly, the system 400 may include robotic manipulation portions to set and/or remove pins (e.g., bypass landing gear pins, safety pins, etc.), switch safety switches, configure wiring, etc., as desired. Further, the system 400 may arm a store using mechanical and/or electronic methods. Accordingly, it is envisioned that the gripping portions 453 may include other types of interfaces/engagement members which may be suitable for a desired operative task. The robotic manipulation portions may be situated as part of, or independently from, a corresponding lift portion. Accordingly, the robotic manipulation portions may be mounted upon the base portion 102.

Figure 5A:
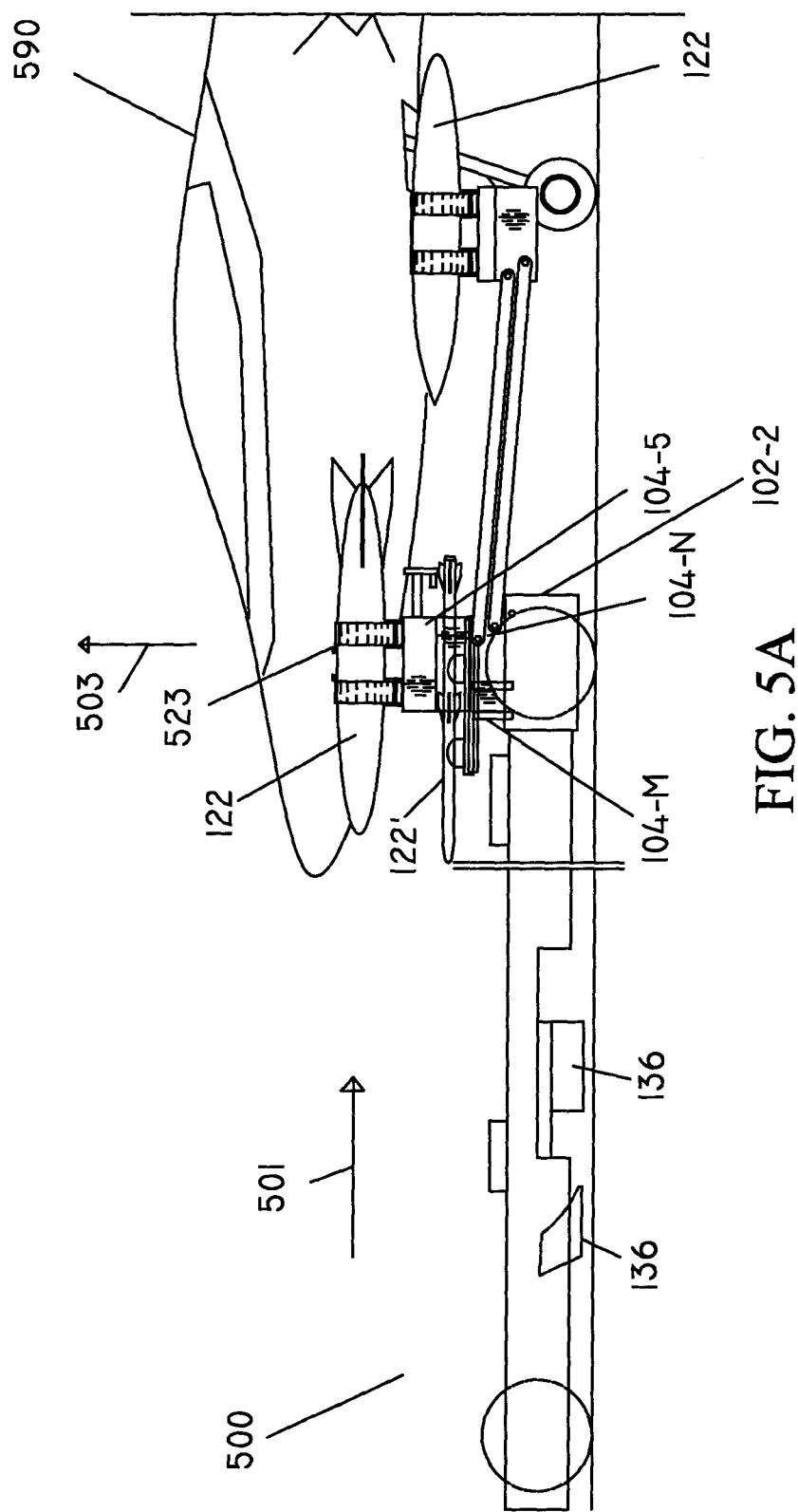
FIG. 5A is side schematic view of a loading operation of an apparatus according to an embodiment of the present system.

FIG. 5A is side schematic view of a loading operation of a system 500 according to an embodiment of the present system. The system 500 is similar to the apparatus 400. However, the system 500 may include a lift portion 104-M in addition to lift portions 104-5, 104-N on base portion 502-2 and may include similar lift portions on a first base portion 102-1. The system 500 may be maneuvered relative to an aircraft 590 as indicated by arrow 501 so as to locate the system 500 in a docking position relative to the aircraft 590 and ready to load stores 122 and 122' onto hardpoints of the aircraft and/or load other material onto the aircraft (e.g., fuel, oil, etc.). In the docking position, the system 500 may also dispense cooling gas/fluid (e.g., air, etc.) to cool various components of the aircraft (e.g., cool the brakes and dispense environmental air for the cockpit, electronics cooling, etc.), provide electric power to the aircraft, replenish compressed gasses (e.g., nitrogen, oxygen, etc.) on the aircraft. The system 500 and/or the aircraft 590 may be maneuvered in accordance with a predetermined docking process or may be docked manually (e.g., via user manipulation of the apparatus 500 and/or aircraft 590 using a control interface). The lift portions 104-x are in a maneuvering position (e.g., lowered) and may be operative to raise corresponding stores 122, 122' (e.g., as indicated by arrow 503) and/or otherwise manipulate (e.g., in accordance with an attachment routine) the stores so as to attach the stores 122, 122' unto corresponding hardpoints. The anvils 136 of the chock portion 138 are shown in an open and lifted position. The system 500 may be guided to a proper position automatically using any suitable method such as radio frequency (RF) guidance, optical guidance, magnetic guidance, etc. Further, the system 500 may obtain aircraft information (e.g., aircraft identification, aircraft type, etc.) and may use this information and/or sensor information (e.g., RF, optical, etc., sensor information) to dock with the aircraft.

Figure 5B:
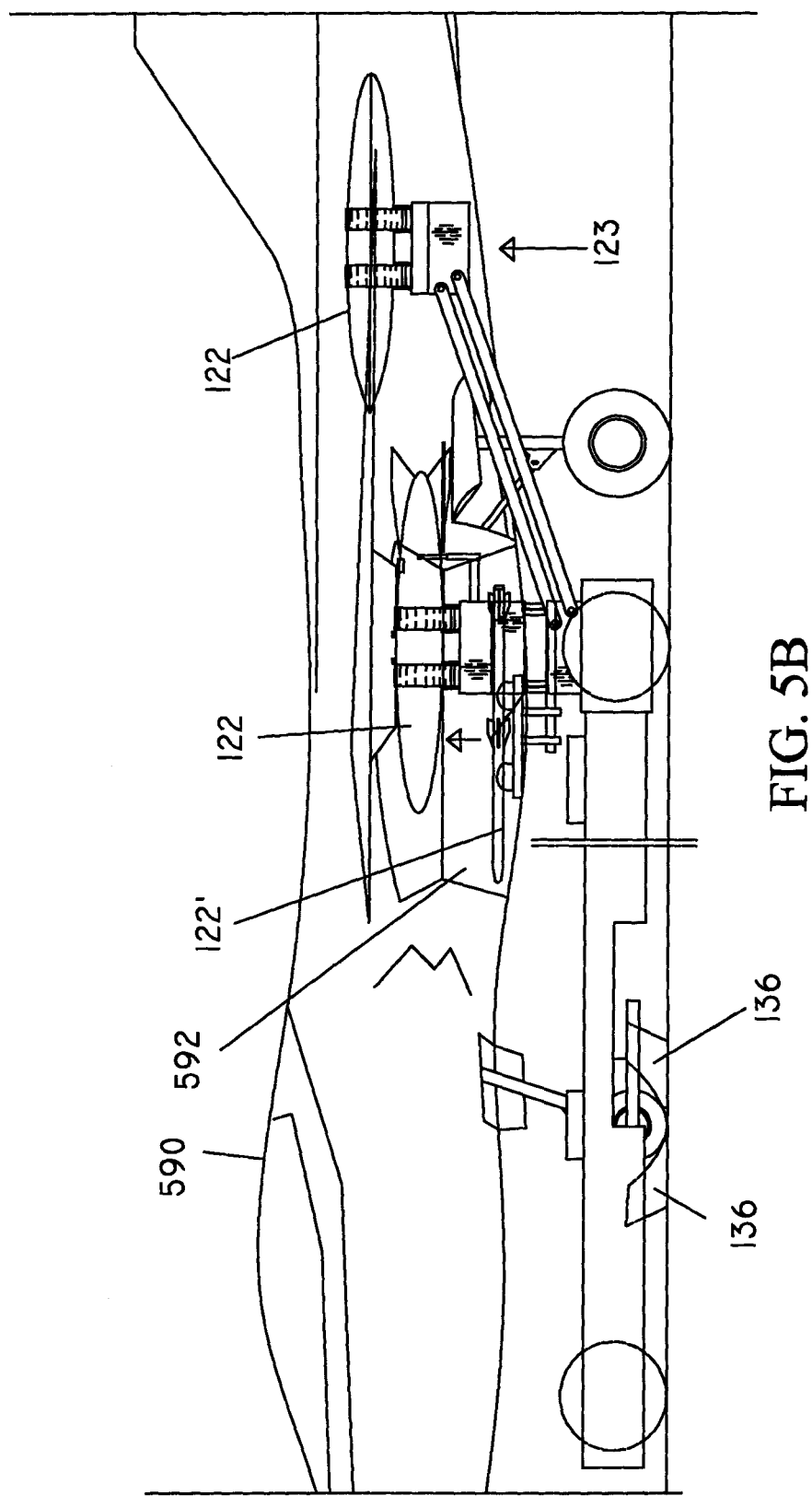
FIG. 5B is side schematic view of a loading operation of a system according to an embodiment of the present system.

FIG. 5B is side schematic view of a loading operation of the system 500 according to an embodiment of the present system. When, the system 500 is in a desired position, the system 500 may lock its wheels and/or one or more of the wheels of the aircraft may be chocked and/or lifted by the chocks 136 (which may themselves be lifted if desired for mobility, etc.). For example, in the present embodiment the forward landing gear may be chocked by anvil portions 136. However, in other embodiments other landing gear (e.g., the main landing gear, etc.) of the aircraft 590 may be chocked and/or lifted unto a cradle of the system. Further, it is envisioned that other types of anvil portions may be provided to chock and/or lift other landing gear wheels of the aircraft 590. Stores 122 and 122' may be lifted (e.g., as illustrated by arrow 523), positioned relative to the aircraft 590, and/or attached to a corresponding hardpoint of the aircraft 590 by a corresponding lift portion 104-x operating under the control of the control portion 106. While stores 122 are attached to external hardpoints, store 122' may be attached to an internal hardpoint of an internal bay 592 of the aircraft 590 (e.g., all-IP). Accordingly, the system 500 may replenish stores to both sides of the aircraft, internal bays, and/or fuselage belly portions, simultaneously.

It is further envisioned that the present system may include a landing gear clamping mechanism which may clamp a landing gear in a desired position using a clamping portion which may, for example, clamp a nose landing gear of an aircraft being serviced in a desired position relative to one or more portions of the system. Moreover, it is envisioned that the system may include ramps or a cradle upon which an aircraft wheel or wheels may be placed. Moreover, it is envisioned that a jacking member may be include to jack a landing gear so as to lift a tire off the ground when it is desired to change, for example, the tire (or corresponding wheel assembly).

Figure 5C:
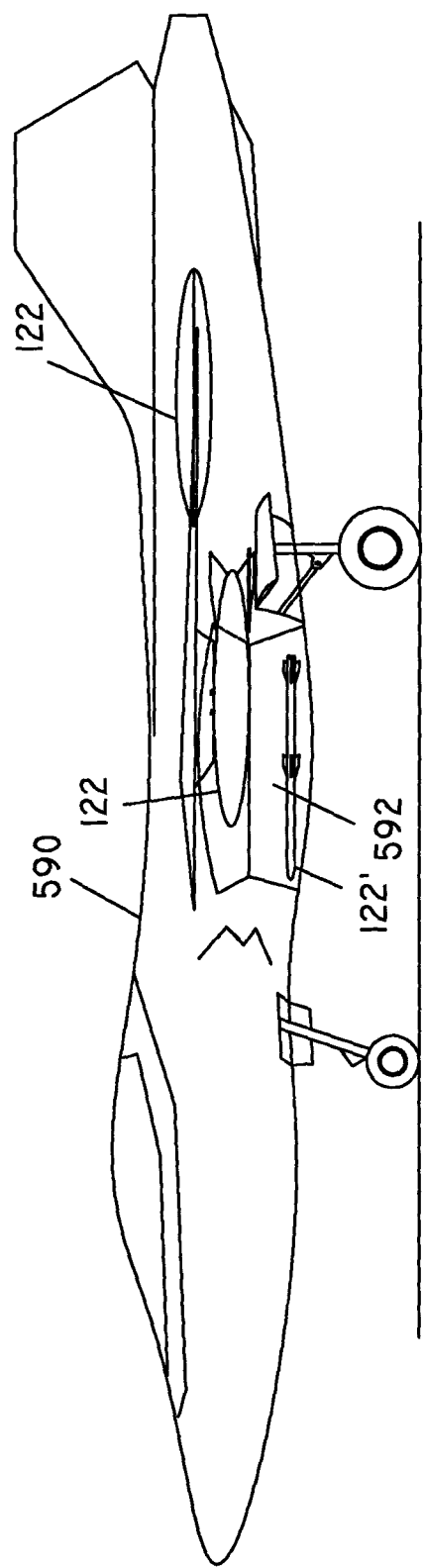
FIG. 5C is side schematic view of the aircraft loaded with stores and in accordance with an embodiment of the present system.

FIG. 5C is side schematic view of the aircraft 590 loaded with stores 122 and 122' in accordance with an embodiment of the present system. The aircraft 500 is loaded with stores 122 and 122' and/or fueled by the system 500. Accordingly, a reduced integrated combat turn time of the aircraft may be achieved between sorties.

Figure 6A:
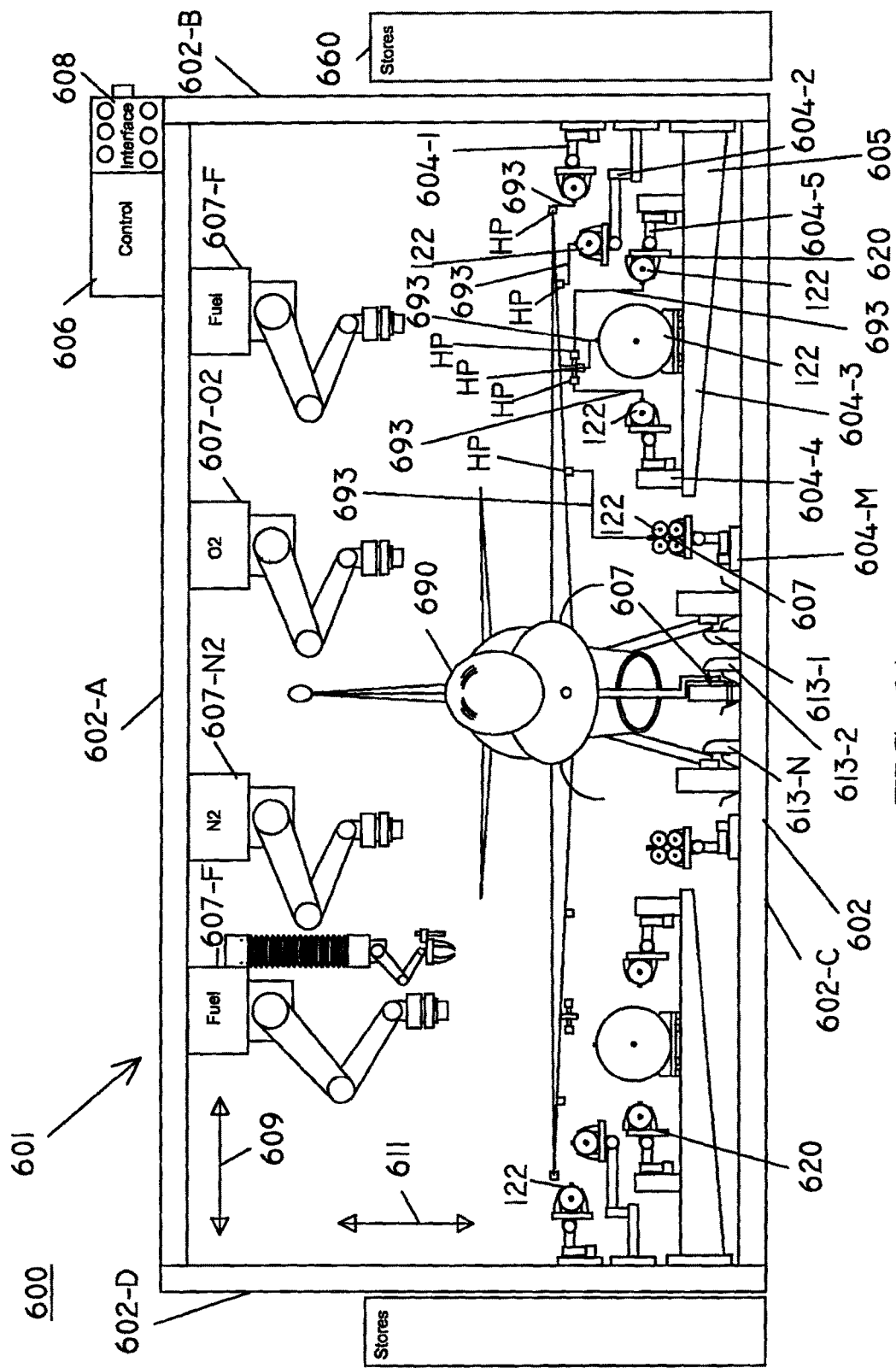
FIG. 6A is front schematic view of a system according to an embodiment of the present system.

FIG. 6A is front schematic view of a system 600 according to an embodiment of the present system. The system 600 may include station 601 having one or more of: abase portion 602, lift portions 604-x, flow portions 607-x, a control portion 606, and an interface portion 608, one or more of which may be located locally and/or remotely to each other. Portions of the system 600 such as the lift portions 604-x may be similar to those of the system 100. However, the base portion 602 of the apparatus 600 may include one or more support portions such as side supports 602B and 602D, a top support 602A, and a bottom support 602C (generally 602-x) each of which may include a mounting portion one or more rails, tracks, openings, tabs, brackets, pins, and/or other attachment portions for movably or fixedly securing the lift portions 104-x and/or the flow portions 607-x in a desired position or positions. The lift portions 604-x may be mounted to and adjacent support portion (e.g., see, 602B and 602D) and/or to each other (e.g., see, 604-4 and 604-5 which are mounted to a support portion 605 of lift portion 604-3).

The lift portions 604-x and/or the flow portions 607-x may be fixedly or movably mounted to the attached support portion 602-x such that the lift portions 604-x and/or the flow portions 607-x may be positioned (e.g., automatically and/or manually) in a desired location relative to the support portion 602-x to which it is mounted. Accordingly, in the present example, it will be assumed that the support portion 602-x may include rails or tracks which may include cogs or teeth which may receive corresponding cogged or geared pulleys (wheels) of the lift portions 604-x mounted thereto. The control portion 606 may control actuators attached to the geared pulleys or wheels of the lift portions 604-x or the flow portions 607-x such that the lift portions 604-x or flow portions 607-x may be maneuvered to a desired location relative to the attached support portion 602-x. Further, it is envisioned that the rails or tracks of the support portions 602-x may form a continuous rail or track over such that the lift portions 604-x or flow portions 607-x may be repositioned by moving along the continuous track. It is further envisioned that the support portions 602-x may form other shapes such as round or oval ring through which at least port of the aircraft may pass therethrough.

The support portion 605 may include a mounting portion which may be similar to the mounting portion of the supports portions 602-x such that the lift portions 604-x or flow portions 605-x attached thereto may be fixedly or moveably attached. Positions and operative actions, of the lift or flow portions 605-x and 607-x, respectively, may be varied based upon aircraft, aircraft type, aircraft configuration, store type, desired maintenance accessibility, etc. Thus, for example, if it is desired to allow a maintenance crewmember to access a certain area of the wing, a lift portion 604-x in that area may be manipulated (folded, and/or moved) such that it will not hinder access to the desired area until, for example, an input by a user indicating that access is no longer required (or other similar input) is received, automatically or via a user interface.

Although lift portions 604-x are shown mounted to support portions 602B and 602D, it is also envisioned that some or all of the lift portions 604-x may be mounted to one or more of the top and/or bottom support portions 602A and 602C, respectively.

The lift portions 604-x may include one or more of: an end portion 609, arms 609, and a grasping member 620. The grasping member 620 may be attached to the end portion 609 and may be configured to secure a corresponding store 122 such that the store 122 may be maneuvered (e.g., in multiple axes) in accordance with a desired manipulation process so as to position a store 122 in a desired location (e.g., having a position defined by, for example, x, y, and/or z coordinates) and/or attached to a desired hardpoint of the aircraft 690. Accordingly, the lift portion 604-x may include multi-axis (e.g., six, seven axis, etc.) functionality which may maneuver the store 122 (e.g., in multiple degrees of freedom) in accordance with a loading routine for the aircraft 690 along a single or multi-axis path. Further, one or more lift portions 604-x such as lift portion 604-M may simultaneously load multiple stores attached to a rack 607 which may then be attached to corresponding hardpoint as shown. Accordingly, the system 600 may attach stores 122 to a corresponding hardpoint of the aircraft 690 as indicated by the lines 693. Moreover, robotic manipulation portions may be provided to couple electronic interfaces of the stores 622 to corresponding interfaces of the aircraft 690. The system 600 may include manipulation devices to couple hardwire links between the stores and the aircraft. The robotic manipulation portions may be part of, or separate from, the lift portions 604-x. For the sake of clarity, numerical designations of lift portions on the left side of FIG. 6A have not been provided.

The flow portions 607-x may include one or more flow portions such as a fuel flow portion 604-F, a nitrogen gas flow portion 604-N2, and an oxygen flow portion 604-O2 each of which may include a coupling portion which may be operative to couple a service nozzle (SN) of a flow portion 607-x to a corresponding fill port such as a fuel fill port, an Oxygen (O2) fill port, a Nitrogen (N2) fill port, respectively. However, other flow portions such as air, oil, etc., are also envisioned. The SN may be coupled to the corresponding fill port using any suitable method such as by using pressure, friction, latches, screw mounts, bayonet mounts, etc. For example, it is envisioned that the SN may be screwably coupled to a corresponding fill port (e.g., a fuel fill port) by automatically inserting and thereafter rotating the SN about its longitudinal axis so as to couple (e.g., screwably, bayonetably, etc.) the SN to the fill port in accordance with a predefined operating process. The flow portions 607-N2, 607-O2, and/or 607-F may provide feedback information (e.g., optical images, proximity, orientation, etc. information) to the controller such that the control portion 606 may distinguish features and may control the flow portions 607-x to maneuver the SN portion to a desired location and may automatically couple the SN to a corresponding port of the aircraft using an automated routine. However, it is also envisioned that the control portion 606 may control the flow portions 607-x to position a corresponding SN in a desired location (e.g., at a specific height, distance, etc. from a part of the aircraft (such as a fuel fill area) so that a user (e.g., a ground crew member) may manually attach the SN portion to a corresponding fuel fill port. Further, the flow portions 607-x may include multi-axis manipulation portions controlled by the control portion 606 and which may be provided to remove/attach fasteners (e.g., screws, etc.), open supply doors, caps, etc., and/or to couple a supply nozzle to a corresponding port (e.g., fuel supply nozzle to fuel port, etc.) under the control of the control portion 606.

The system 600 may further include heating/cooling (HC) portions 613-x such 613-1 through 613-N which may be supply a flow coolant (e.g., cool air) via an output ports to desired parts or areas (hereinafter areas) of the aircraft 690 such as the brakes of the landing gear, and/or other parts of the aircraft 690 which may require a flow of coolant. The HC portions 613-x may supply, for example, ambient, cooled, or heated air to desired areas of the aircraft 690. Accordingly, each HC portion 613-x may be coupled to a source of coolant (e.g., cool air flow) or may include a fan to generate a flow of coolant and may direct the coolant via output ports to one or more desired areas of the aircraft 690 as illustrated by arrows 615. Accordingly, each HC portion 613-x may include single or multi-axis manipulators which may position the output ports (OPs) relative to a desired area of the aircraft (e.g., the landing gears) so as to supply a flow of coolant to the desired area(s). However, in a single axis configuration, the HC portions 613-x may be movably mounted (e.g., on a track, rails, etc.) and may move in a direction of the aircraft in the system so that output port may flow the coolant to the desired area of the aircraft 690 as the aircraft 690 may move relative to one or more portions of the system 600. For example, HC portions 613-1, 613-2, and 613-N may supply a flow of coolant to the right-rear, nose, and left-rear landing wheel hubs, respectively, of the aircraft 690. Accordingly, the system 600 may maintain a flow of coolant to a desired area of the aircraft 690 during operation.

Further, one or more of the HC portions 613-x may be fixed relative to each other (e.g., by commonly mounting these portions together, etc.) and/or may be uniformly controlled by the control portion 606 to direct airflow to the desired areas of the aircraft 690. Accordingly, the HC portions 613-x may include a single or multi-axis actuation portion which may be operative to direct the ports of the HC portions 613-x such that that coolant (e.g., airflow) may be provided to the desired areas of the aircraft 690.

The lift portions 604-x and/or the flow portions 607-x may be mounted to rails of the corresponding support portions 602-x such that they may be travel along the corresponding rails as shown by arrows 609 and 611 so as to adjustable based upon, for example, an aircraft type, configuration, location, operation (e.g., fuel tank attachment, rocket attachment, refueling, etc.) etc. The control portion 606 may control the overall operation of the system 600 and may obtain and identification of the aircraft 690 and may obtain information specific to the aircraft such as desired stores, aircraft configuration, aircraft type, etc. The control portion 606 may use this information to select stores, load lift portions 604-x with corresponding stores from, for example, a store supply 660, to place the (e.g., selected) stores 122 in position relative to the aircraft 690, and/or to connect the stores 122 to corresponding hardpoints (HP) of the aircraft 690. The apparatus may learn a method to attach the stores 622 to corresponding hardpoints of the aircraft using a learning process which may form and/or store corresponding information as LI or other information (e.g., ACI, CMI, RSI) for later use by the apparatus 600. Further, the system 600 may associate the LI with the aircraft such that it may be easily retrieved using an ID of the aircraft.

For space conservation, security, protection from the elements, etc., a system (e.g., which is similar to the system 600) may further include one or more retraction and/or extension (hereinafter each of which will be referred to as retraction portions) portions such as retraction rails to retract the system (e.g. vertically) below a first level (e.g., a ground level or deck) to another level (e.g., underground, a lower level or deck, etc.) where stores may be loaded unto corresponding lift portions, then the system (or parts thereof) may be raised to the first level such that an aircraft may be resupplied with stores by the system. Accordingly, the system may extend through several decks of, for example, an aircraft carrier, etc. It is further envisioned that embodiments of the system may be coupled to a turntable such that an aircraft being supplied with stores may be turned on the turntable to a desired direction under the control of a control portion and/or a user. It is further envisioned that the system may be mounted to a vehicle such as a truck so to provide mobility in an advancing theater.

Figure 6B:
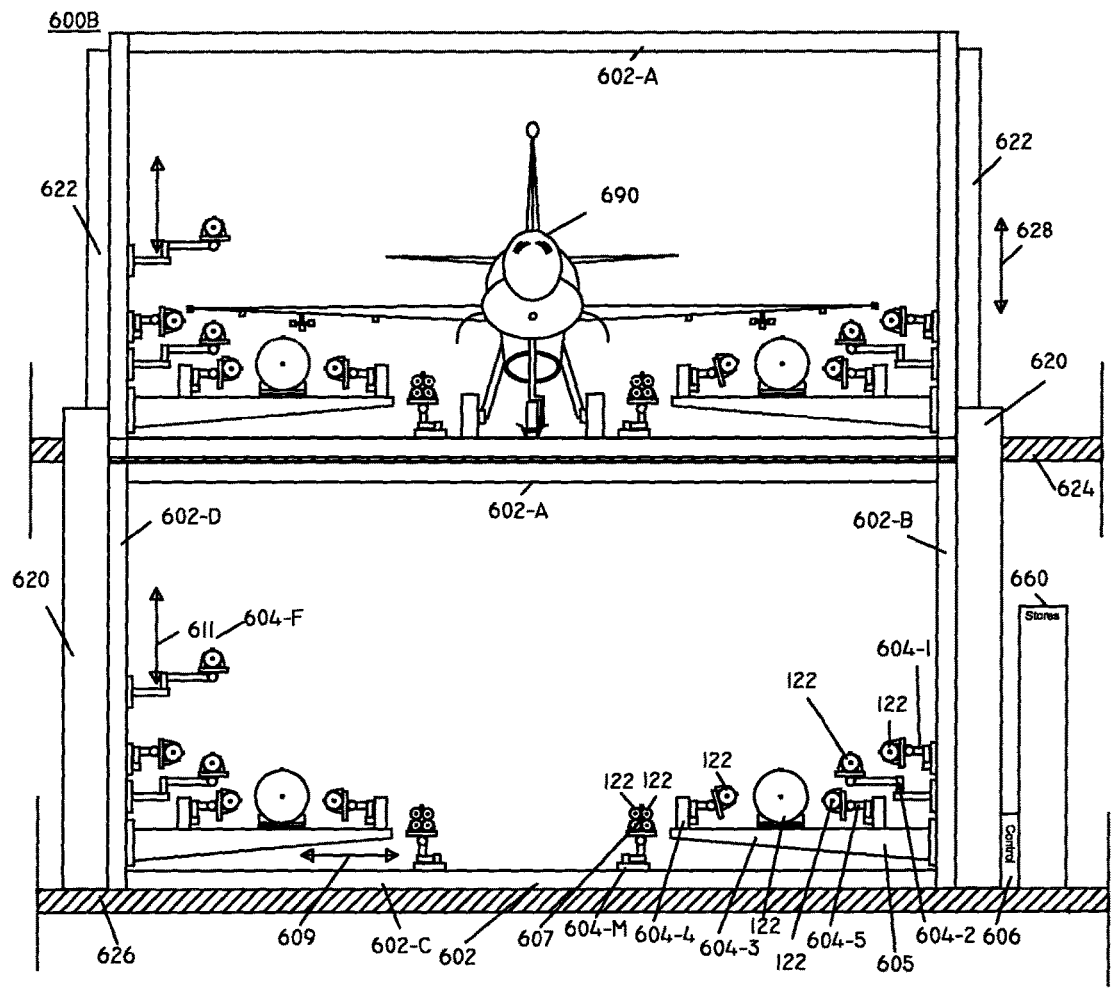
FIG. 6B is a front schematic view of a system according to an embodiment of the present system.

FIG. 6B is a front schematic view of a system 600B according to an embodiment of the present system. The apparatus 600B may be similar to the apparatus 600. However, the apparatus 600B may include retraction portions 620, 622 which may raise and/or lower the base portion 602 of the apparatus 600B. Accordingly, the apparatus 600B may be placed at a first level (e.g., deck 626) for loading stores, maintenance, etc., and may be raised (e.g., vertically via an opening, etc.) to another level (e.g., deck 624) for servicing the aircraft 690. The apparatus 600B may be raised and then may service the aircraft 690 which may pass through the apparatus 600B. However, it is also envisioned, that one or more portions of the support portions 602-x may include openings or may be removed such that the system 600B may be raised with the aircraft 690 in place. Accordingly, the system 600B may include openings in, for example, the support portions 602-x such as in the top support 602-2 portion such that the system 600B may be raised with the aircraft 690 in place above the system 600B.

Further, it is envisioned that the system may hinge about one or more axes of the system such as a vertical and/or horizontal axes so as to conserve space when in certain positions such as a folded position. The system may then be rotated to a servicing position to, for example, service an aircraft. Accordingly, the system may include one or more hinge portions and or actuator portions (e.g., hydraulic cylinders, etc.) to facilitate folding of the apparatus, when desired. Moreover, it is envisioned that the system may include a horizontal retraction mechanism which may move the system in a horizontal direction such that it may be slid into or out of a desired location.

Figure 7:
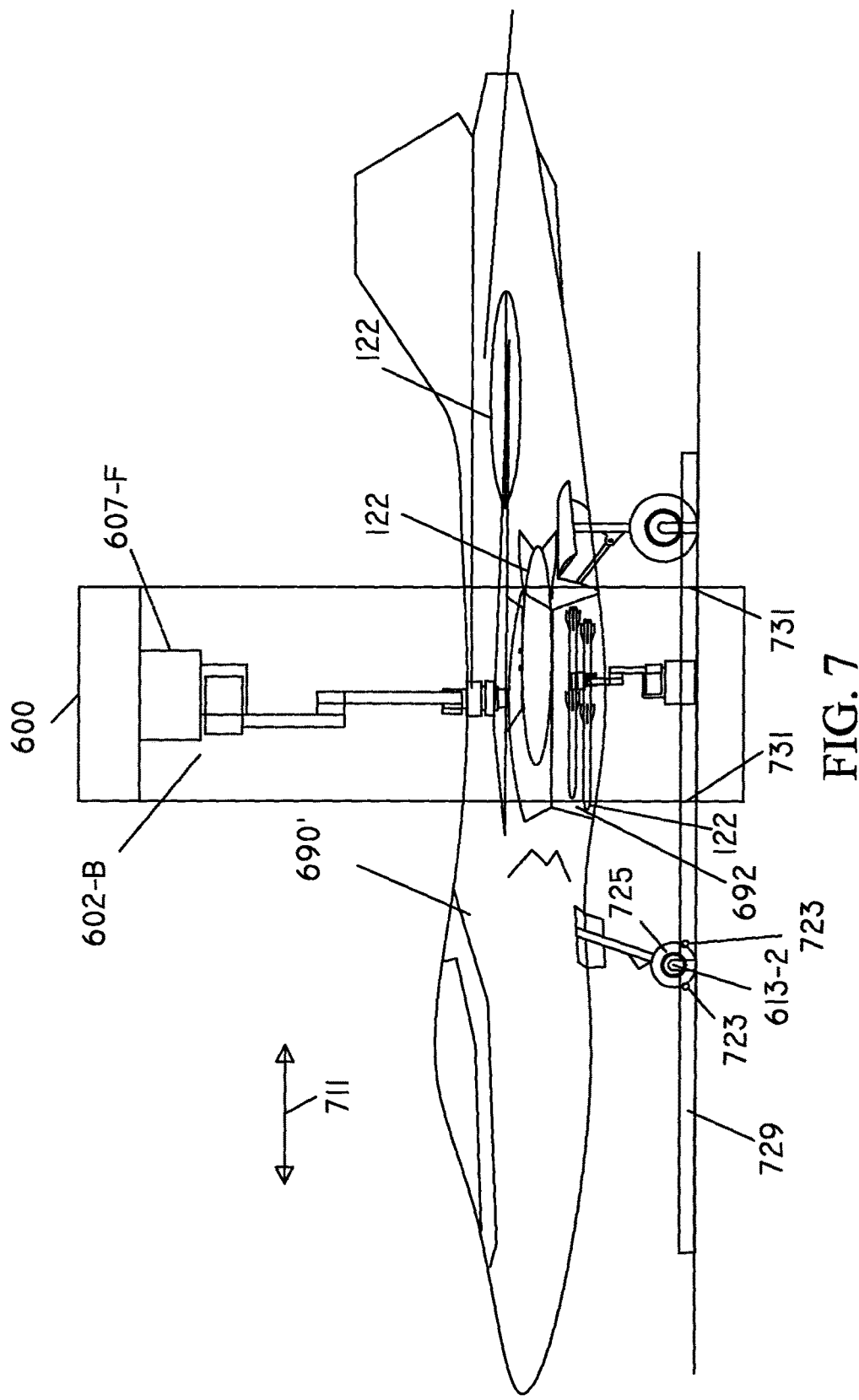
FIG. 7 is side schematic view of the system according to an embodiment of the present system.

FIG. 7 is side schematic view of the system 600 according to an embodiment of the present system. An aircraft 690' is shown in a loading position and may be moved forward/rearward (as indicated by arrow 711) by, for example, the control portion 606 so as to position certain hardpoints and/or fuel ports of the aircraft 690' in a desired position relative to, for example, base portions 602B during operation of the system (e.g., during an integrated combat turn-around operation, etc.) under control of the control portion 606. Accordingly, the apparatus may include one or more guide portions such as guide rails or tracks 729 (hereinafter both of which will be referred to as tracks) which may guide a corresponding part of the aircraft 690' such as a landing gear or wheel of the aircraft along a desired path. The guide tracks 729 may include an engagement portion such as rollers 723 which may engage a corresponding wheel (e.g., a nosewheel 725) so as to move the aircraft 690' to a desired position. The rollers 723 may receive a motive force from a linear actuator controlled by the control portion of the system. It is further envisioned that the guide tracks may further include a push/pull portion operative under the control of the control portion 606 and which may push or pull a corresponding portion of the aircraft such as a wheel, landing gear, etc. of the aircraft to the desired location. The push/pull portion may be coupled to, for example, an actuator such as an electrical motor via a chain, belt, or cable drive. However, it is also envisioned that other motive methods may be used to move the aircraft 690' such as a draw bar, a clamp, etc., attached to a landing gear strut, etc. of the aircraft 690' and which is coupled to, for example, a linear an actuator portion (e.g., controlled by the control portion 606) such as a hydraulic actuator, a screw type actuator, etc. Further, portions of the guide tracks or rails 729 may separate from each other at one or more areas such as areas 731 as the support portions 602-x are lowered. However, it is also envisioned that the guide tracks or rails 729 may be folded, etc. Further, the type, position (e.g., distance between parallel tracks, etc.) may be set by the system in accordance with an aircraft ID, type, configuration, etc.

The HC portions 613-x may be coupled to the guide tracks 729 and be operative to substantially remain in position relative to the aircraft 690' as the aircraft 690' may be moved by the system so as to provide a flow of coolant to desired areas of the aircraft 690' such as the wheel brakes. Feedback information (e.g., from sensors) may be provided to the control portion 606 to determine and/or adjust a location of the aircraft 690'. Accordingly, the apparatus may load stores unto certain portions of the aircraft (e.g., inboard hardpoints of a swept wing aircraft) and may then move the aircraft such that outboard hardpoints (e.g., wingtip hardpoints, etc.) of the aircraft may be loaded with corresponding stores. The lift portions 604-x may be retracted after stores are loaded. The system 600 may also load stores into internal hardpoints such as hardpoints in internal bay 692 of the aircraft 690'. Further, the system 600 may include an aircraft lift which may lift one or more portions of the aircraft 690' to service the aircraft (e.g., change wheels, etc.). A gas or liquid supply may be flow coupled to corresponding HC or flow portions 613-x 607-x, respectively, via corresponding hoses, pipes, tubing, etc. Lift portions 604-x and/or support portions 605 of the lift portion 604-3 may raise (or lower) and/or swing such that it does not interfere with a ground crew either before and/or after loading of stores as shown, under the control of the control portion 606. Accordingly, the control portion 606 may render a display for the convenience of the user in which a user may select to certain positions (e.g., raised, stored, etc.) for selected lift portions 604-x and/or support portions 606. One of the flow portions 607-F is shown in a fueling position. Further, in yet other embodiments, it is envisioned that the system may refuel wet stores (e.g., auxiliary wing tanks, etc.) or may mount empty, partially or fully fueled wet stores unto hard points of an aircraft.

Figure 8:
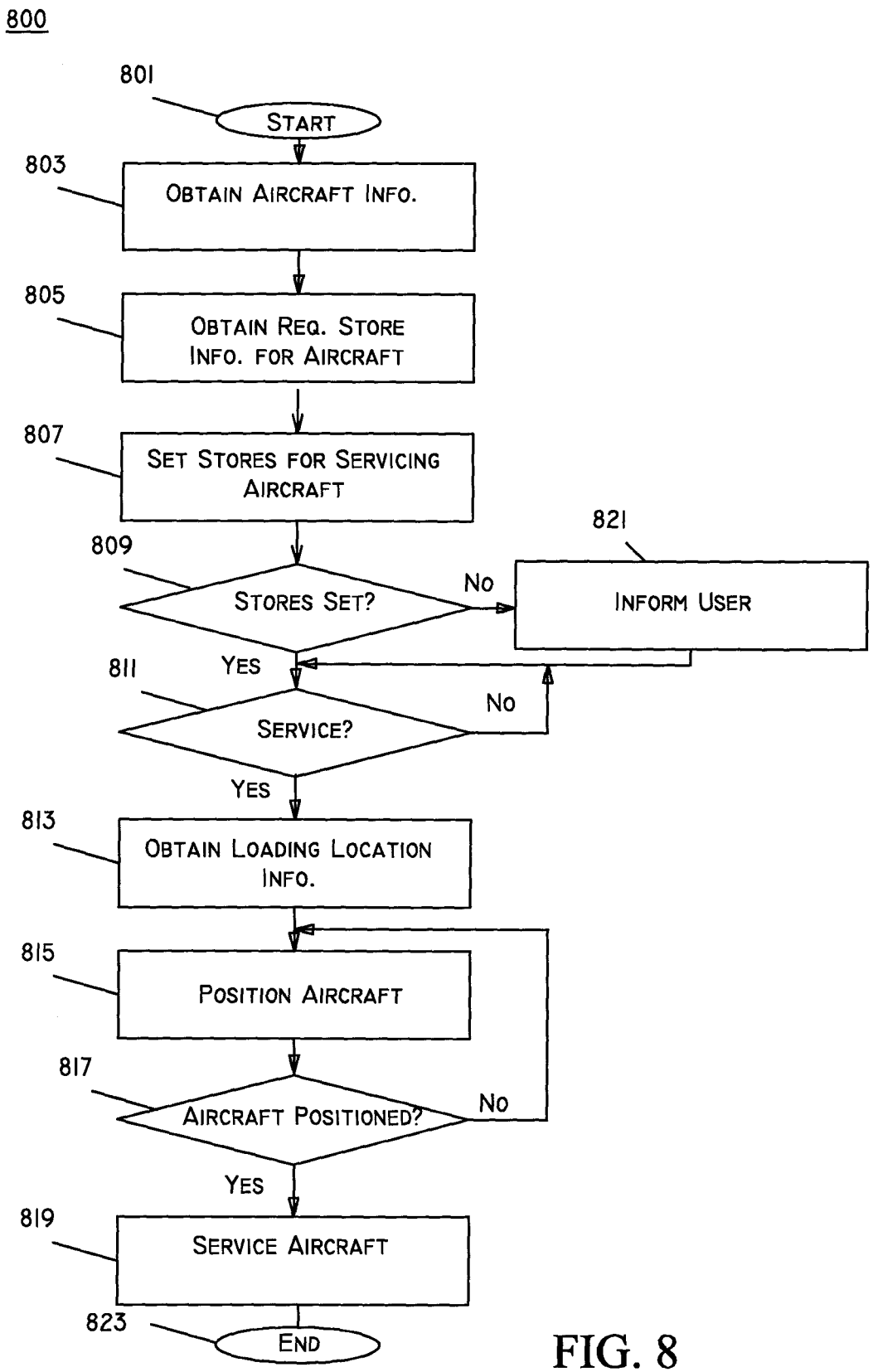
FIG. 8 shows a flow diagram that illustrates a process in accordance with an embodiment of the present system.

FIG. 8 shows a flow diagram that illustrates a process 800 in accordance with an embodiment of the present system. The process 800 may be performed using one or more computers communicating over a network. The process 800 can include one of more of the following acts. Further, one or more of these acts may be combined and/or separated into sub-acts, if desired. In operation, the process may start during act 801 and then proceed to act 803.

During act 803, the process may obtain information related to an aircraft to be serviced such as aircraft identification (ID). Process may then use the aircraft ID to obtain (e.g., from a memory of the system) aircraft configuration information (ACI) which may include information related to the aircraft such as type, block number, configuration, dimensions, historical information (e.g., cycle information, airtime, use information (e.g., number of ejections for each hardpoint, etc.), image information (e.g., images of the aircraft or parts thereof (e.g., engines fan images, wing images, etc.) for later comparison, power plant information, hardpoint type and location, rack unit type and/or location, software or firmware configuration, etc. The process may then match and/or assign an aircraft to a loading system (e.g., see, 100) or vice versa while an aircraft is on the ground or airborne. For example, a first type (or configuration) of loading system may be assigned (e.g., by the system) to an F16-A while a second type of loading system may be assigned to an F16-C, and a third type of loading system may be assigned to an F35, etc. Accordingly, the system may use a table lookup (e.g., obtained from a memory of the system) to determine which type of loading system configurations to assign to which aircraft. After completing act 803, the process may continue to act 805.

During act 805, the process may obtain requested store information (RSI) for the assigned aircraft from a memory of the system or from a user (e.g., a pilot, a ground crew member, etc.). The RSI may include information such as requested stores (e.g., 100 gallon fuel tanks, AA missiles (and type), etc. and/or information related to a current mission information CMI (e.g., for a future mission the aircraft) e.g., ground attack, air-to-air attack, electronic counter measures, air-to-air refueling (e.g., buddy refueling), etc. and may be accessed in accordance with the aircraft ID. Accordingly, the process may determine stores for the aircraft in accordance with the current mission information or may obtain the store information directly from the RSI. After completing act 805, the process may continue to act 807. The CMI may include logistical information such as load, distance, flying configuration, weight, fuel use, drag information, flight time, etc. The CMI and/or the RSI may be included in the ACI.

During act 807, the process may set the requested stores on an apparatus such as system 100, 600 for servicing the aircraft. Accordingly, process may perform acts to automatically retrieve stores and/or set the stores on corresponding lift portions of the apparatus (e.g., AGM-65's on #1 and #6 (wing end) lifts, 200 gal. fuel tanks on #3 and #4 (inner) lifts, AIM 120's on #2 and #5 (midwing) lifts, (where the lifts each load a corresponding hardpoint of the aircraft) etc.). The stores may be secured to corresponding lift portions using any suitable method. After completing act 807, the process may continue to act 809.

During act 809, the process may determine whether the requested stores are set in the corresponding lift portions. Accordingly, if the requested stores are determined to be set in their corresponding lift portions, the process may continue to act 811. However, if the process determines that the requested stores are not set in their corresponding lift portions, the process may continue to act 821. The process may determine whether a store is set using sensor feedback information from sensors (e.g., on the lift portions) which may indicate the presence of a store and/or whether the store is secured to a corresponding lift portion. A store may also be determined to be not set when a store is determined to be unavailable (e.g., due to no stock).

During act 821, the process may inform the system and/or user of a store which is not available, not set (e.g., secured) to its corresponding lift, etc. For example, the process may inform of missing stores, stores which are not secured by a corresponding clamping portion, etc., in accordance with feedback information, etc. Accordingly, the process may inform that a stock of "x-type" external fuel tanks is not available and/or may recommend a suitable substitute in accordance with the aircraft ID, ACI, RSI and/or CMI. For example, upon determining that a first type of air-to-air store is unavailable, the process may recommend a similar type of air-to-air store. After completing act 821, the process may continue to act 811.

During act 811, the process may determine whether an aircraft service request has been generated. The aircraft service request may be generated by the system (e.g., upon determining that an aircraft will be ready to service within a threshold time period, upon sensing the presence of an aircraft within a threshold distance and/or within a predetermined area, upon receiving a request generated by an aircraft to be serviced, and/or by a user), etc. Accordingly, if the process determines that a service request has been generated, the process may repeat act 813. However, if the process determines that a service request has not been generated, the process may repeat act 811. Further, the process may generate a service request when it determines that an arrival time period Ta (e.g., a time from the current time and to a time at which the aircraft will be ready for servicing) is less than a threshold time.

During act 813, the process may obtain loading location information corresponding with a location at which the aircraft is to be serviced. The loading location information may correspond with a geophysical location, a loading dock, a loading pad, a loading bay, and/or other information which may correspond with the location at which the aircraft is to be serviced. The loading location information may be generated by the system (e.g., using a scheduling routine, etc.) or may be obtained from a memory, of the system. It is further envisioned that the loading location information may be set in accordance with a location at which the aircraft to be serviced is parked, the aircraft ID, ACI, RSI and/or CMI. After completing act 813, the process may continue to act 815.

During act 815, the process may perform an aircraft positioning routine to position the aircraft for servicing. Accordingly, the process may inform the aircraft to be serviced of the location at which the aircraft is to be serviced and await the arrival of the aircraft or may use a docking guidance method such as a conventional visual docking guidance system to guide the aircraft to the loading location. Accordingly, the process may communicate with a visual docking guidance system to transmit and/or receive information to/or from the visual docking guidance system which may be used to guide the aircraft and/or portions of the system (e.g., 100) to a desired position, area, bay, etc. The process may also control, for example, the system (e.g., 100) to position itself relative to the aircraft or vice versa and/or may generate and/or receive sensor information indicating positions of the aircraft and/or portions of the system (e.g., 100) which may be used to update docking information used by the system and/or the aircraft. After completing act 815, the process may continue to act 817.

During act 817, the process may determine whether the aircraft to be serviced is positioned for servicing. Accordingly, if it is determined that the aircraft to be serviced is positioned for servicing, the process may continue to act 819. However, if it is determined that the aircraft is not positioned for servicing, the process may repeat act 815. The visual docking guidance system or other docking system may generate and/or transmit information indicative of a successful docking operation such as a dock OK message.

During act 819, the process may begin an aircraft servicing process which may be operative to attach a plurality of stores to the aircraft being serviced. After completing act 819, the process may continue to act 823 where it ends.

Figure 9:
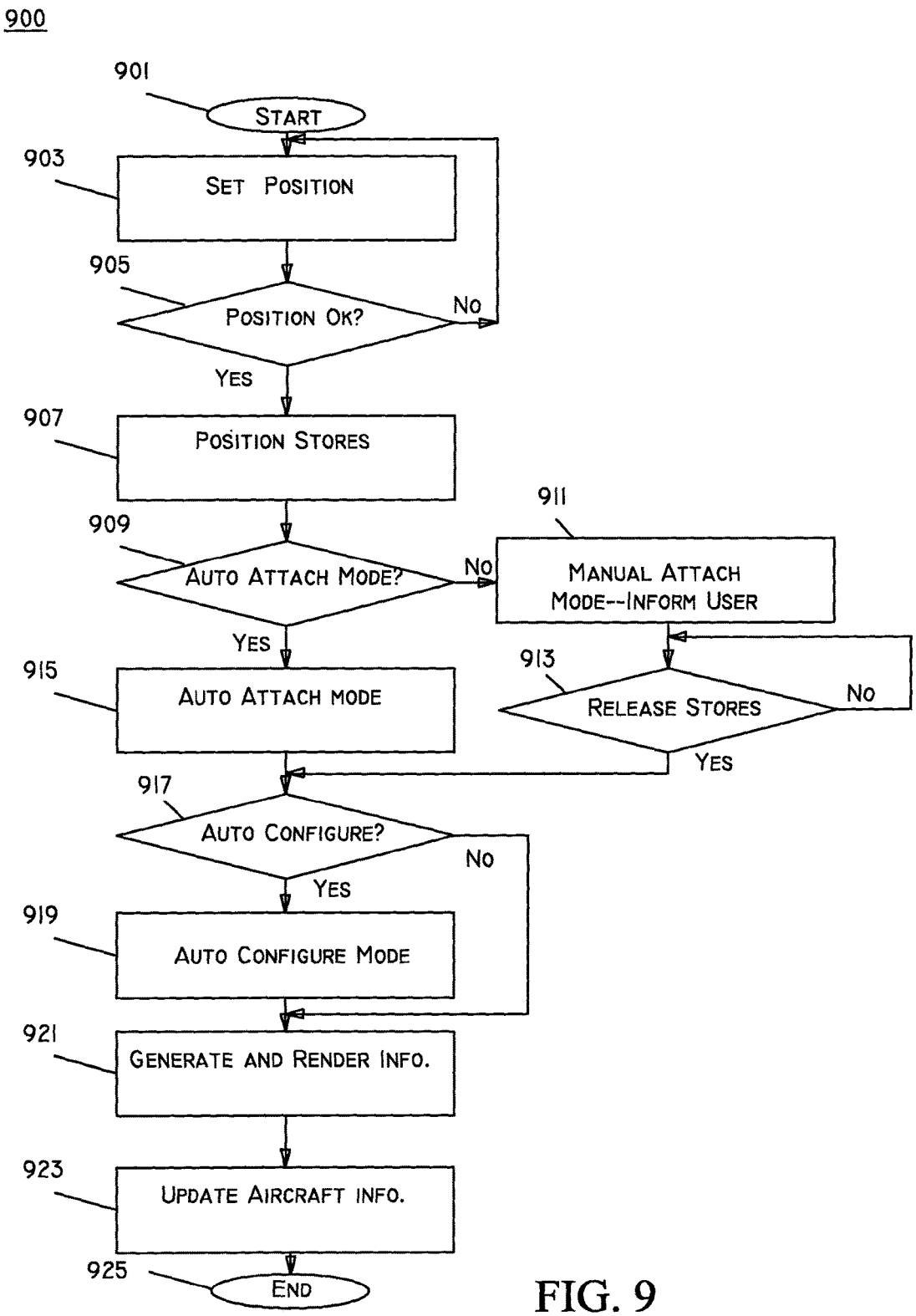
FIG. 9 shows a flow diagram that illustrates a process in accordance with an embodiment of the present system.

FIG. 9 shows a flow diagram that illustrates a process 900 in accordance with an embodiment of the present system. The process 900 may be performed using one or more computers communicating over a network. The process 900 can include one of more of the following acts. Further, one or more of these acts may be combined and/or separated into sub-acts, if desired. In operation, the process may start during act 901 and then proceed to act 903.

During act 903, the process may position the aircraft to be serviced relative to the system (e.g., see, 100, 600, etc.). Accordingly, the process may use any suitable positioning method to position the aircraft relative to the system. For example, the aircraft may be clamped in place, placed upon a cradle, rail, track, and/or locked in a desired position relative to the system (e.g., see, 100, 600, etc.) or portions thereof. Similarly, the process may engage friction members such as brakes to secure the system in a desired location relative to the aircraft. However, it is also envisioned that the process may place the system in position relative to the aircraft and/or a stationary object. For example, if the system is currently in a loading position (e.g., underground position), the process may be operative to position portions of the system (e.g., the base portions 602-$x$) in a position suitable for servicing the aircraft (e.g., in an upper level position). The process may receive sensor information from one or more sensors such as optical sensors (e.g., laser, imaging, etc.), mechanical (e.g., switches, etc.), electrical (e.g., magnetic, etc.), and/or combinations thereof to determine the position of one or more of the portions of the system and/or the aircraft. Then, using the sensor information, the process may adjust the position of the system and/or the aircraft to one or more positions suitable for servicing the aircraft. After completing act 903, the process may continue to act 905.

During act 905, the process may determine whether the position of the aircraft and/or the system (or parts thereof) is suitable (e.g., is within one or more threshold distances) for servicing the aircraft. Accordingly, if the process determines that the position is suitable for servicing the aircraft, the process may continue to act 907. However, if the process determines that the position of the aircraft and/or the apparatus is not suitable (e.g., is not within one or more threshold distances) for servicing, the process may repeat act 903.

During act 905, the process may position stores (e.g., by controlling corresponding lift portions) for attachment of stores to corresponding hardpoints of the aircraft. The stores may be positioned in accordance with a position of the system relative to the aircraft (e.g., a first position for inboard wing hardpoints and a second position for outboard wing hardpoints) which may be set in accordance with information such as the aircraft ID, CMI, RSI, etc. Accordingly, the process may control the lift portions such that corresponding stores are located at a desired location (e.g., at predetermined location x, y, z, and/or having a desired orientation, etc., as set forth in the CMS information) and/or may use an optical recognition method to recognize one or more features of the aircraft being serviced and set the stores in a predetermined position (e.g., obtained from the CMS information, etc.) relative to the recognized features. Accordingly, the process may receive sensor information and/or may control the lifts in accordance with the sensor information (e.g., optical information), and/or information related to the Aircraft ID, ACI, CMI, and/or RSI. Thus, operation of the lift portions may occur in a parallel and/or serial manner based upon settings of the system. For example, the user may desire to access a certain area of the aircraft for a certain maintenance procedure. Accordingly, the process may control lift portions which may be determined to physically hinder access to the area by the user so that these lift portions are located in a position which may afford better access to the aircraft for the procedure. Accordingly, the process may access a table (e.g., in the ACI) listing service areas and/or maintenance items and corresponding areas to, for example, park a lift and/or lift operations to be performed (e.g., a sequence, etc.) when the service area is to be accessed and/or when a corresponding maintenance procedure.

The process may also perform an inspection of the aircraft to determine whether the aircraft has sustained any damage. Accordingly, the process may scan the aircraft and/or parts thereof using any suitable scanning method (e.g., optical scanning, laser scanning, etc.) and may compare the scanned information with historical information (e.g., obtained in the ACI from the memory) using any suitable imaging technique or techniques (e.g., digital signal processing (DSP), optical image recognition, etc.) and determine whether there are any discrepancies. For example, the process may image a leading edge of a wing of the aircraft and compare this information with a previous image of the leading edge of the wing (e.g., in the ACI information) and determine whether any damage is present. If the process determines that there is damage, the process may inform a user of the damage (e.g., by rendering "damage to wing at location L3" and may highlight the damaged area on a display of the system for the convenience of the user. The process may also obtain image information of internal components (e.g., turbine blades, fuel cells, etc.) and determine whether these parts are damaged. Accordingly, the system may inform a user of damage to an aircraft. The system may also determine whether stores are present on the aircraft (e.g., optically or by communicating with the aircraft) before starting to service the aircraft and may take appropriate actions (e.g., not operate a lift portion with a store corresponding with a hardpoint which is currently loaded with another store, remove the currently loaded store, etc.). Further, the present system may include a robotic manipulation portions which may be controlled by the controller to check detectors such as oil chip detectors, etc. The present system may further include imaging devices (e.g., cameras, scanners, etc.) mounted to robotic manipulation portions such that the imaging devices may oriented to image the aircraft and/or portions thereof such as an engine inlet duct, engine turbine blades, etc. Then the process may compare the images with preexisting images (e.g., from the ACI) of the same portions of the aircraft and detect (e.g., using an image recognition techniques) the presence of any damage, abnormities, etc. Accordingly, the process may control a robotic manipulation portion to insert a camera into one or more areas (e.g., an access port, the engine inlet, etc.) to obtain desired images even while the engine may be running (e.g., as during a hot-pit refueling operation). The process may position stores within a threshold distance of a corresponding hardpoint in accordance with one or more settings of the system in accordance with one or more of the aircraft ID information, ACI, CMI, RSI, and/or a user input. Thus, a user (e.g., a ground crew member or members) may attach one or more selected stores to the aircraft manually if desired. However, to save time and/or effort, the stores may be lifted automatically to a desired position based upon a system configuration. After completing act 907, the process may continue to act 909.

During act 909, the process may determine whether to enable an automatic store attachment mode to automatically attach the stores to the aircraft being serviced. Accordingly, if it is determined to enable the automatic store attachment mode, the process may continue to act 917. However, if it is determined not to enable the automatic store attachment mode, the process may continue to act 911. The process may determine not to automatically attach the stores and thus, enter a manual attachment mode based upon a system configuration when, for example, damage is detected, a user input requesting a manual attachment mode is received, an error is detected, etc.

During act 911, the system may enter a manual store attachment mode and/or inform a user of via a rendering device of the system such as a display, a speaker, etc., that a manual store attachment mode has been enabled using a message such as: "manual store attachment set," "stores awaiting attachment by user as per user request," "wing damage at inner pylon location, automatic attachment disabled," "automatic store attachment process disabled as per system configuration, etc., and may await a user input. In the manual store attachment mode, stores will not be automatically attached to a corresponding hardpoint of the aircraft. After completing act 911, the process may continue to act 913.

During act 913, the process may determine whether to release a store from a corresponding lift portion. Accordingly, when it is determined that a store should be released, the process may continue to act 915. However, when it is determined that a store should not be released, the process may repeat act 913. The process may determine to release a store at the request of user which may be input via an interface of the system. For example, each lift portion may include hard and/or soft keys which may be depressed by a user to perform a desired action such as release stores, manipulate a lift portion in one or more axes, etc.

During act 915, the process may enter an automatic store attachment mode and may automatically attach stores to corresponding hardpoints of the aircraft being serviced. Accordingly, the process may control the lifts in accordance with loading information (LI) retrieved from a memory of the system in accordance with the aircraft ID information, ACI, CMI and/or RSI and which may include information suitable for manipulating a corresponding store for attachment to the corresponding hardpoint. For example, the ACI may include information related to the location/orientation of a hardpoint orientation (e.g., x, y, z, $\alpha$, $\beta$, $\gamma$, etc.), where x, y, z, refer to rectilinear coordinates (e.g., x, y, distance, and z height), and $\alpha$, $\beta$, $\gamma$, refer to orientation yaw, pitch, and roll, respectively,) relative to an absolute location (e.g., of the base portion, etc.). The LI information may include information related to a loading operation (e.g., loading path for the store, etc.) which may be followed to place the store in a desired location/orientation and/or attach the store to the corresponding hardpoint. The ACI may include information related to torque specification for the hardpoint, hardpoint configuration, etc. The LI may be learned by the system in a learning mode in which a user may manipulate a store to attach it to a desired hardpoint. The system may follow the position/orientation of the store and may then store this information in a memory of the system for later user. The process may also identify features of the aircraft (e.g., of the hardpoint, etc.) and may attach the store to the hardpoint using feedback information in accordance with a predetermined routine. The LI may be programmed by a user and may include numerical control instructions or the like to lift and/or secure a store to a corresponding hardpoint. The process may secure or release stores, manipulate ratchets, etc., to tighten/loosen screw jacks to predetermined torque settings, insert, remove, and/or tighten bolts, pins, etc., manipulate insertion portions (e.g., insertion arms) to insert/remove pyrotechnic cartridges in, for example, pyrotechnic BMUs, etc., set sway braces to predetermined settings, etc., and/or perform other actions such as replacing pyrotechnic ejector charges in accordance with one or more of the aircraft ID information, ACI, CMI, RSI, LI, and/or a user input. After completing act 915, the process may continue to act 917. The process may also automatically control robotic manipulation portions to replace chaff/flares, etc. of the aircraft.

During act 917, the process may determine to configure stores. Accordingly, if it is determined to enter an automatic store configuration mode, the process may continue to act 919. However, if it is determined not to enter an automatic store configuration mode, the process may continue to act 921. The process may determine to enter an automatic store configuration mode based upon a system setting which may be obtained from, for example, checking a flag set in the aircraft ID, ACI, CMI, the RSI, and/or LI. However, a user may also configure the system to enter the automatic store configuration mode.

During act 919, the process may enter an automatic store configuration mode in which the process may control one or lift portions and/or robotic manipulation portions to configure stores automatically. For example, the process may control the system 100 to set and/or arm stores (e.g., stores that were attached to corresponding hardpoints of the aircraft being serviced), add fuel to stores (e.g., drop tanks, etc.), update computer systems of the aircraft (e.g., flight control computers, fire control computers, etc.). After completing act 919, the process may continue to act 921.

During act 921, the process may generate and/or render information generated by the process on one or more displays of the system. For example, a pilot may be informed (e.g., via a display of the fuel load, (e.g., 5000 lbs. fuel in main tanks, 200 gallons in wingtip tanks installed at number 1 and number 6 wet hardpoints, etc.) and of stores (e.g., missiles, etc.) loaded on other hardpoints. The ground crew may also be informed of the status of the system (e.g., stores loaded successfully, etc.), etc. After completing act 921, the process may continue to act 923.

During act 923, the process may update information related to the servicing of the aircraft in a memory of the system. Accordingly, the process may update one or more of the aircraft ID information. The aircraft ID information may include information related to the CMI and/or RSI which may be accessed for maintenance and/or used to determine an aircraft maintenance schedule, etc. After completing act 923, the process may continue to act 925, where it ends.

Figure 10:
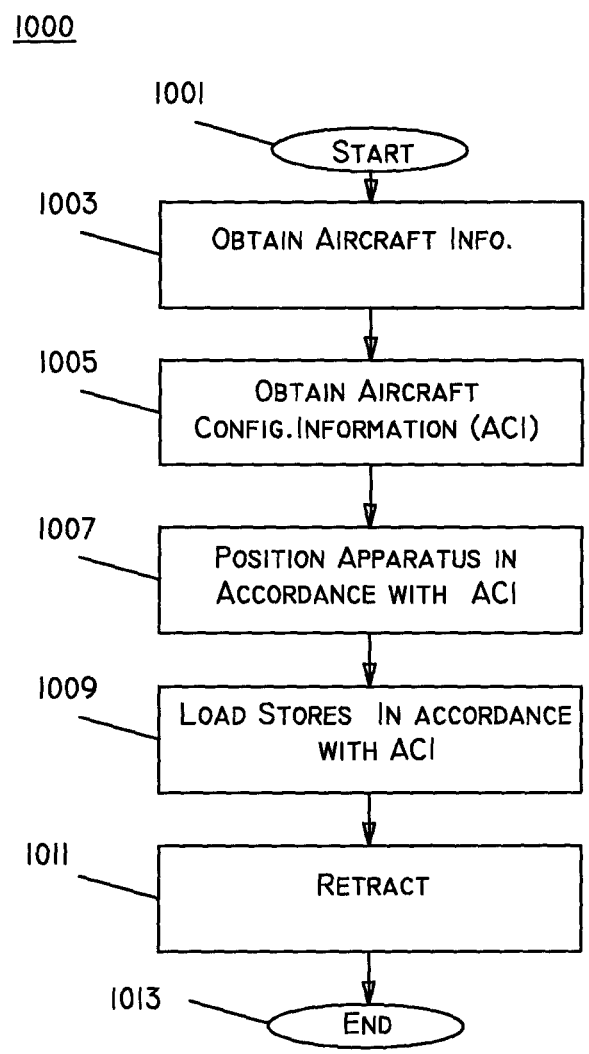
FIG. 10 shows a flow diagram that illustrates a process in accordance with an embodiment of the present system.

FIG. 10 shows a flow diagram that illustrates a process 1000 in accordance with an embodiment of the present system. The process 1000 may be performed using one or more computers communicating over a network. The process 1000 can include one of more of the following acts. Further, one or more of these acts may be combined and/or separated into sub-acts, if desired. In operation, the process may start during act 1001 and then proceed to act 1003.

During act 1003, the process may obtain aircraft ID of an aircraft to be serviced. The aircraft ID may be directly obtained from the aircraft via a wired and/or wireless communication link, may be assigned by the system, and/or entered by a user. After completing act 1003, the process may continue to act 1005.

During act 1005, the process may obtain aircraft configuration information (ACI) in accordance with the aircraft ID and which may include information related to aircraft type (F15D, F22, F35, etc. . . . .), serial number, configuration, a configuration of hardpoints on the aircraft (e.g., BRU-46/A inboard, BRU-47/A outboard, etc.), current stores (expected) to be loaded, current stores on the aircraft (e.g., external stores, internal stores, etc.), landing gear type, dimensions of the aircraft, expected fuel load, etc., servicing location (e.g., pad 5), loading information (learned loading information, programmed information, etc.), etc. The servicing location may be fixed and/or assigned by the system. Further part of the ACT may be set in accordance with a link established with the aircraft (e.g., to obtain expected stores currently on the aircraft, expected (landing) fuel load on the aircraft (e.g., before servicing), etc.). After completing act 1005, the process may continue to act 1007.

During act 3007, the process may position the apparatus (e.g., 100, 600, etc.) relative to the aircraft (e.g., by moving the aircraft and/or the apparatus or parts thereof) in accordance with the ACI. Accordingly, the ACI may include relative coordinate information for this procedure. After completing act 1007, the process may continue to act 1009.

During act 1009, the process may load and/or attach stores to the aircraft in accordance with the ACI. For example, the process may control actuators (e.g., motors, solenoids, clutches, etc.) of the lift portions to manipulate corresponding stores in a loading pattern (e.g., in accordance with the LI, etc.) so that the stores may be attached to corresponding hardpoints of the aircraft. The process may also control manipulation portions to set adjustments, load pyrotechnic charges in, for example, ejectors, set torque settings of, for example, screw jacks, etc., arm stores, etc. The process may also control to configure the stores (e.g., arm the stores, place or remove flags, set or remove pins (e.g., landing gear pins, safe pins, ejector seat pins, etc.). This process may be performed in a parallel and/or sequential process in accordance with the ACI. The process may also command to resupply an energy source of the aircraft such as by refueling (e.g., one or more tanks of the aircraft), charging batteries, supplying power, etc. After completing act 1009, the process may then continue to act 1011. The store loading process may rely upon computer vision algorithms which may recognize features of the aircraft such as, for example, a point of interest which may include a texture, a shape, a structure (such as a hardpoint, etc.) etc. The process may then associate (e.g., using a computer vision algorithm) this point of interest with a corresponding feature on a computer model (e.g., a hardpoint, etc.). By associating the points of interest on the aircraft with a computer model that the process is programmed to understand, the process may autonomously devise an approach to securing the stores to the aircraft and/or may devise an approach to docking and/or servicing the aircraft. However, it is also envisioned that the process may obtain information related to one or more predetermined locations (e.g., within a certain distance $\Delta$ of a corresponding hardpoint and having a, for example, a coordinate and/or orientation (e.g., x, y, z, $\alpha$, $\beta$, $\gamma$, etc.), where x, y, z, refer to a rectilinear coordinates (e.g., x, y, distance, and z height), and $\alpha$, $\beta$, $\gamma$, refer to orientation yaw, pitch, and roll, respectively,) and control actuators of the lift portions to place the stores at these predetermined locations. Accordingly, the process may control the lift portions to, for example, lift or drop one or more stores to a predetermined height (position and/or orientation), in a synchronous or serial manner.

During act 1011, the process may retract lift portions, refueling portions, and/or may disengage from the aircraft. The process may update a memory of the system to reflect the servicing. After completing act 1011, the process may continue to act 1013 where it ends.

Although various processes are shown according to embodiments of the present system, it is envisioned that the present system may preform acts in accordance with predetermined procedures. For example, the present system may perform an integrated combat turnaround procedure in accordance with predetermined integrated combat turnaround routine which may be stored in a memory of the system.

Figure 11:
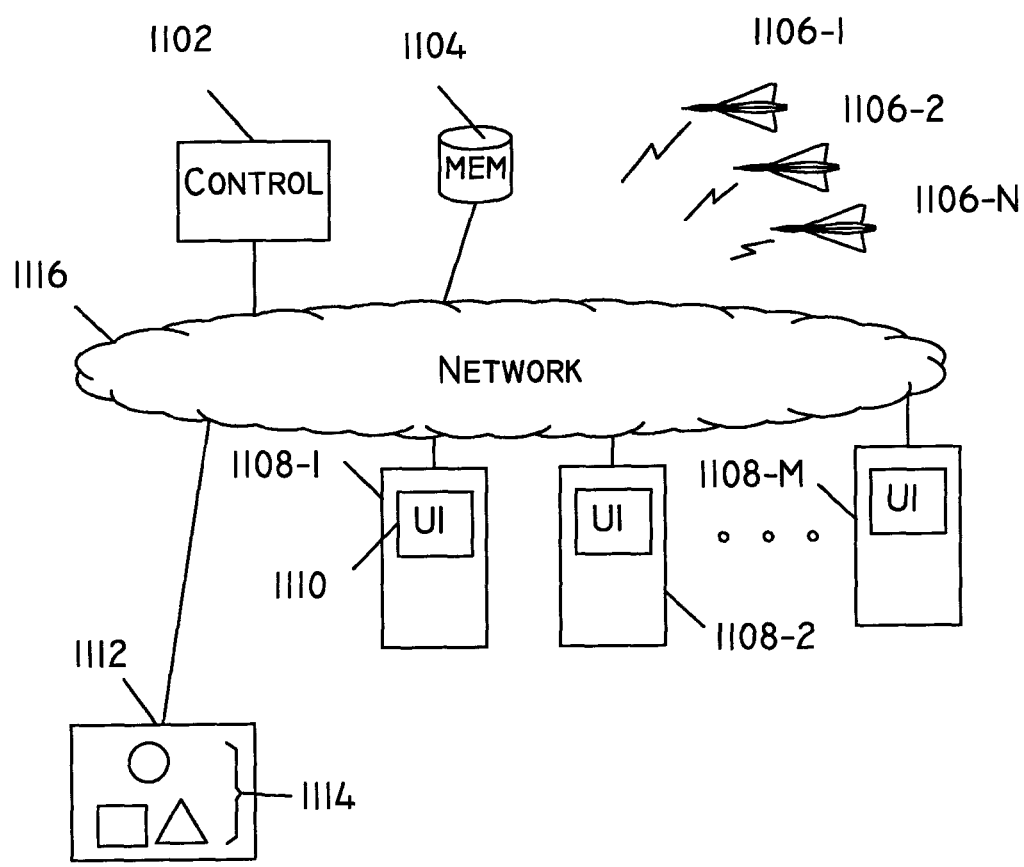
FIG. 11 is a schematic view diagram of a portion of a system in accordance with an embodiment of the present system.

FIG. 11 is a schematic view diagram of a portion of a system 1100 in accordance with an embodiment of the present system. The system 1100 may include one or more of a control portion 1102, a memory portion 1104, vehicles 1106-1 through 1106-N (generally 1106-*x*), a network 1116, stations 1108-1 through 1108-M, and a store portion 1112, one or more of which may communicate with each other using one or more communication techniques.

The control portion 1102 may include one or more servers, processors, computational devices, etc., which may be coupled to the network and/or may control the overall operation of the system 1100. Accordingly, the control portion 1102 may communicate with a communication device of one or more vehicles 1106-*x* via a wired and/or wireless communication link (or links) and may send and/or receive information related to a corresponding vehicle (e.g., a group of vehicles, a specific vehicle in a group, etc.) such as one or more of stores present (e.g., on the vehicle) or dispensed, expected stores (e.g. unused stores at landing), fuel (e.g., expected fuel load at landing), operational performance (e.g., aircraft error codes, etc.), ID, expected time-of-arrival (e.g., at an airport for servicing), expected flight duration (e.g., +05:23 hours), mission information, location (e.g., geophysical location), etc. The control portion 1102 may further communicate with one or more of the stations 1108-*x* and determine current status (e.g., fully charged, loaded with stores for F16A No. 10/1234), location (pad #, airport location, etc.), etc. Similarly, the control portion 1102 may communicate with the store portion 1112 to receive information related to stores (e.g., type, quantity available, location, etc.). The control portion 1102 may then determine whether to assign stores 1114 in the store portion 1112 to a station 1108-*x* and/or whether to assign a vehicle 1106-*x* to a station 1108-*x*. The control portion 1102 may then communicate this information to one or more of the vehicles 1106-*x*, the store portion 1112, and/or the stations 1108-*x* and may await confirmation of the communication. The control portion 1102 may also generate scheduling information which may include, for example, scheduling information related to arrival times/locations (e.g., landing times) of the vehicles 1106-*x*, store loading times/locations for the stations 1108-*x*, and/or service times/locations for the vehicles 1106-*x*, etc., using a suitable scheduling method. The control portion 1102 may then transmit the scheduling information to the vehicles 1106-*x* and/or the stations 1108-*x*.

The memory portion 1104 may be accessed by the control portion 1102 and may include any suitable memory such as, for example, a persistent memory or memories which may be located in locally and/or remotely from each other. Accordingly, the memory portion 1204 may include a surface area network (SAN) memory, etc. The memory portion 1102 may store information required by the system such as information generated by the system 1100, operating applications, programs, data, historical information, scheduling information, information related to aircraft, information related to stores, and/or other information used by the system, etc.

The Network 1116 may include on or more networks such as wired and/or wireless networks, a wide area network (WAN), a local area network (LAN), a telephony network, the Internet, an intranet, a proprietary network, a military network, etc.

The store portion 1112 may include one or more stores which may be accessed and/or loaded by an assigned station 1108-*x*. The store portion 1112 may include a plurality of store portions 1114 of the same or different types, etc. Further, the system 1100 may determine a location of each store portion 1112 and/or stores 1114 of a corresponding store portion 1112. Accordingly, the control portion 1102 may assign a station 1108-*x* to a store portion 1112 based upon distance and/or availability. The store portion 112 may include one or more automated manipulation portions to automatically retrieve stores and/or load the stores unto corresponding lift portion of a station 1108-*x*.

The stations 1108-*x* may include manipulation portions to set stores 1114 and/or to load (e.g., attach) the set stores 1114 unto an assigned vessel 1106-*x*. The stations 1108-*x* may further include an interface with which a user may interact such as a display, a speaker, a microphone, a keyboard, a touch screen, a pointing device (e.g., a mouse, a trackball, a touchpad, etc.). Further, the stations 1108-*x* may generate a user interface (UI) 1210 with which a user may interact with the system 1100.

Figure 12:
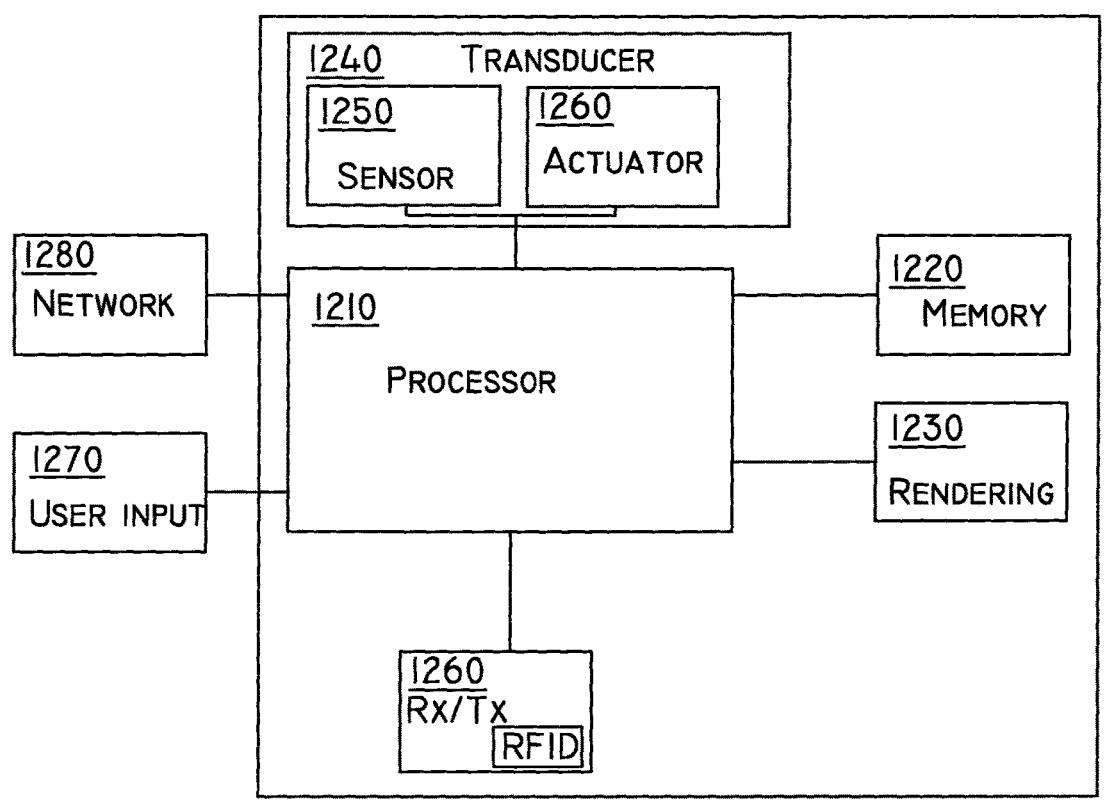
FIG. 12 shows a portion of a system (e.g., peer, server, etc.) in accordance with an embodiment of the present system.

FIG. 12 shows a portion of a system 1200 (e.g., peer, server, etc.) in accordance with an embodiment of the present system. For example, a portion of the present system may include a processor 1210 operationally coupled to a memory 1220, a rendering portion 1230, a transducer portion 1240, a receiver/transmitter (Rx/Tx) portion 1260, a user input device 1270, and a network 1280. One or more portions of the system 1200 may be locally or remotely located and/or may be combined or separated from each other.

The memory 1220 may be any type of device for storing application data as well as other data related to the described operation. The application data and other data are received by the processor 1210 for configuring (e.g., programming) the processor 1210 to perform operation acts in accordance with the present system. The processor 1210 so configured becomes a special purpose machine particularly suited for performing in accordance with the present system.

The operation acts may include requesting, providing, and/or rendering of content such as status information, aircraft information, information generated by the system, information related to stores, etc. The user input 1270 may include a keyboard, mouse, trackball or other device, including touch sensitive displays, which may be stand alone or be a part of a system, such as part of a personal computer, personal digital assistant (PDA), mobile phone, smart phone, set top box, television or other device for communicating with the processor 1210 via any operable link. The user input device 1270 may be operable for interacting with the processor 1210 including enabling interaction within a UI as described herein. Clearly the processor 1210, the memory 1220, the rendering device 1230, the transducer portion 1240, the receiver/transmitter (Rx/Tx) portion 1260, the user input device 1270, and the network 1280, may all or partly be a portion of a computer system or other device such as a client and/or server as described herein.

The methods of the present system are particularly suited to be carried out by a computer software program, such program containing modules corresponding to one or more of the individual steps or acts described and/or envisioned by the present system. Such program may of course be embodied in a computer-readable non-transitory memory medium, such as an integrated chip, a peripheral device or memory, such as the memory 1220 or other memory coupled to the processor 1210.

The program and/or program portions contained in the memory 1220 configure the processor 1210 to implement the methods, operational acts, and functions disclosed herein. The memories may be distributed, for example between the clients and/or servers, or local, and the processor 1210, where additional processors (logic devices, etc.) may be provided, may also be distributed or may be singular. The memories may be implemented as electrical, magnetic or optical memory, or any combination of these or other types of non-transitory storage devices. Moreover, the term "memory" should be construed broadly enough to encompass any information able to be read from or written to an address in an addressable space accessible by the processor 1210. With this definition, information accessible through a network is still within the non-transitory memory, for instance, because the processor 1210 may retrieve the information from the network for operation in accordance with the present system. For example, the memory may correspond to non-transitory memories available through a cloud computing network.

The processor 1210 is operable for providing control signals and/or performing operations in response to input signals from the user input device 1270 as well as in response to other devices of a network and executing instructions stored in the memory 1220. The processor 1210 may be an application-specific or general-use integrated circuit(s). Further, the processor 1210 may be a dedicated processor for performing in accordance with the present system or may be a general-purpose processor wherein only one of many functions operates for performing in accordance with the present system. The processor 1210 may operate utilizing a program portion, multiple program segments, or may be a hardware device utilizing a dedicated or multi-purpose integrated circuit.

The transducer portion 1240 may be coupled to the processor 1210 and may provide sensor information to the processor 1210 and/or may receive information such as control information, settings, etc., from the processor 1210, and may include a sensor portion 1250 and an actuator portion 1260.

The sensor portion 1250 may include sensors and/or detectors such as position sensor, linear position sensors, angular position (e.g., rotary) sensors, azimuth sensors, acceleration sensors (e.g., single- or multi-axis), orientation sensors, a gravity/magnetic field sensors, humidity sensors, vibration sensors, electrical field sensors, acoustic sensors, location sensors (e.g., GPS), voltmeters, ammeters, temperature sensors, magnetic sensors, presence sensors, RFID sensors, pressure sensors, load sensors, probes, biometric sensors, chemical sensors, electromagnetic sensors, electromechanical sensors, electroacoustic sensors, electrostatic sensors, thermoelectric sensors, radioacoustic, piezoelectric, strain gauges, sensors, optical sensors (e.g., laser scanners, ultraviolet sensors, cameras, image capture devices (e.g., still and/or video)), etc., which may relate various sensor information related to a sensed physical quantity, etc., to the processor 1210. For example, a store presence sensor may provide information relating to the presence and/or type of store on a lift portion to the processor 1210, a position sensor may provide information related to a position of a lift portion, a chemical sensor may detect a present of chemical contaminants and transmit this information to the processor 1210, etc.

The actuator portion 1260 may be controlled by the processor 1210 and may include actuators such as electronic, hydraulic, pneumatic, piezoelectric, alloy wire, electro-active polymer (EAP) actuators and/or combinations thereof. The actuators may transform an input signal (e.g., received from the processor 1210) into a motive force, motion, and/or displacement. Accordingly, the actuator portion 1260 may include motors (e.g., electrical motors, rotary, linear, piezo-electric, shape alloy, EAP, etc.), solenoids, relays, motion. Specific examples include: electrical motors, pneumatic actuators, hydraulic actuators, linear actuators, comb drives, piezoelectric actuators and amplified piezoelectric actuators, thermal bimorphs, micromirror devices, electroactive polymers, etc. The actuators may also include electrical (e.g., transistor drivers, etc.), mechanical, pneumatic, and/or hydraulic actuators which may be operative to control other actuators such as electrical, hydraulic, hydropneumatic, and/or pneumatic motors. Further, the actuators may include hardpoint actuators such as cartridge dispensing actuators which may release, enable, (e.g., enable/disable electrical firing portions) one or more cartridges under the control of, for example, the processor 1210. Moreover, the actuators may include electro-active polymer (EAP) actuators which may be used, for example, to hold and/or release stores, etc.

The rendering device 1230 may include a display, a speaker, etc. and may render information such as content received from the processor 1210. Accordingly, the rendering device 1230 may include any suitable device rendering information such as a display such as a light emitting diode (LED), a liquid crystal display (LCD), an organic LED (OLED), an electrophoretic-type (e.g., E-INK™ and the like) displays or the like. The displays may further include a touch-sensitive display.

The user input device 1270 may include one or more input devices such as, for example, buttons, a touch-sensitive pad or display, hard or soft keys, a keyboard, and/or the like, with which a user may input information (e.g., on/off settings, release inputs, etc.) by the user to be communicated to the processor 1210 for further processing.

The Rx/Tx portion 1216 may include transmission and/or reception portions to receive information and/or transmit information via wired and/or wireless communication methods. Accordingly, the Rx/Tx portion 1216 may include a downconverter to downconvert a received signal and/or an upconverter to upconvert a signal for transmission. The Rx/Rx portion 1216 may further include antennas for transmission and/or reception of signals, and an interface portion to interface with, for example, an aircraft maintenance interface so as to couple with one or more computational devices of the aircraft. Moreover, the Rx/Tx portion 1216 may include an RFID portion which may communicate with the controller so as to receive, for example, information related to an RFID query and respond with corresponding information (e.g., identification information, type information, status information, update information, user information, etc.) as is typical in an RFID system. The RFID portion may communicate in accordance with any suitable RFID protocol. Accordingly, the RFID portion may query an RFID portion of a store, an aircraft, a lift portion, etc. and receive results of the query from the queried RFID portion. Similarly, the RFID portion may receive queries and provide results of the queries to other devices. The RFID portion may also recognize ground crew members and configure the system in accordance with a setting of the ground crew member which may have been previously stored in memory of the system.

Figure 13:
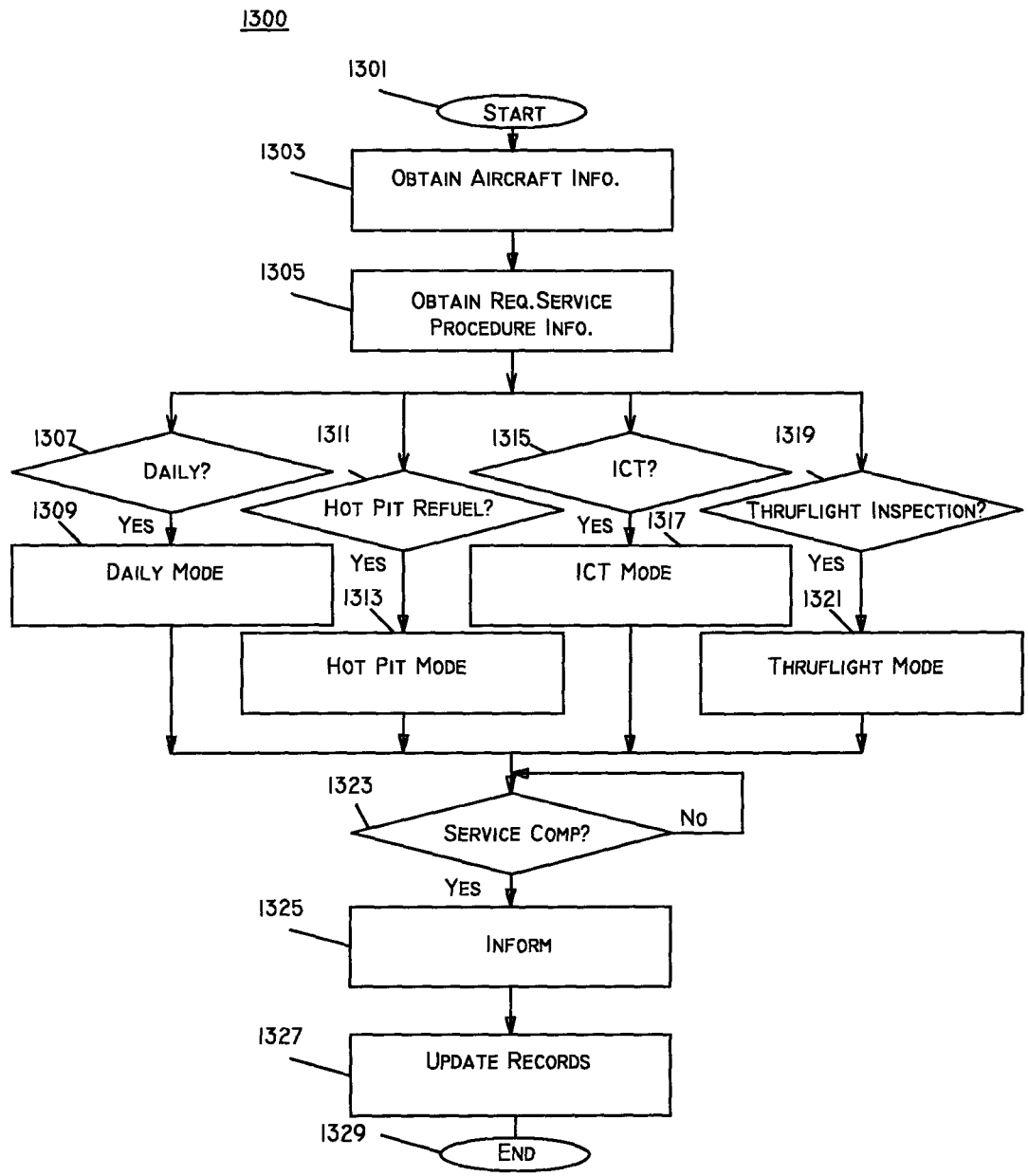
FIG. 13 shows a flow diagram that illustrates a process in accordance with an embodiment of the present system.

FIG. 13 shows allow diagram that illustrates a process 1300 in accordance with an embodiment of the present system. The process 1300 may be performed using one or more computers communicating over a network. The process 1300 can include one of more of the following acts. Further, one or more of these acts may be combined and/or separated into sub-acts, if desired. In operation, the process may start during act 1301 and then proceed to act 1303.

During act 1303, the process may obtain information related to an aircraft which is to be serviced such as an ID of the aircraft (e.g., aircraft ID). Then, the process may continue to act 1305.

During act 1305, the process may obtain requested service procedure information for the aircraft to be serviced. The requested service procedure information may include information related to a type of service mode to be performed by the system on the aircraft to be serviced. The requested service procedure information may be determined by the system, by a user (e.g. by selecting a menu-item from a UI provided by the system) and/or by checking information related to the aircraft such as the ACI, CMI or RSI information for a flag indicative of a service type to be performed upon the aircraft. After completing act 1305, the process may continue to acts 1307, 1311, 1315, and 1317, where the process may determine a service type for the current service by in accordance with the requested service procedure information.

For example, during act 1307, the process may determine whether to enter a daily operation mode, accordingly, if the process determines to perform a daily operation mode, the process may continue to act 1309.

Similarly, during act 1311, the process may determine whether to enter a hot pit refueling mode, accordingly, if the process determines to enter the hot pit refueling mode, the process may continue to act 1313.

Further, during act 1315, the process may determine whether to enter an integrated combat turn (or turnaround) mode (ICT) mode, accordingly, if the process determines to enter the ICT mode, the process may continue to act 1317.

Moreover, during act 1319, the process may determine whether to enter a thruflight inspection service mode refueling mode, accordingly, if the process determines to enter the thruflight inspection mode, the process may continue to act 1321.

During act 1309, the process may perform a daily service upon the aircraft. Accordingly, the process may obtain information related to the service such as a service lookup table (e.g., see, Tables 1 through 4 below each corresponding with a different type of service) from a memory of the system which may correspond with the aircraft to be serviced (e.g., an F-16-B) and may perform a plurality of service items as defined in the corresponding Table 1 presented below.

TABLE 1

Daily Service Type-F16-B

| Operation Sequence | Weight (1-5) | Service Item (Operation) | Operation Mode Auto | Operation Mode Manual |
|---|---|---|---|---|
| 1 | 5 | Remove Protective Covers A, B, C | X | |
| 2 | 5 | Remove Protective Covers D & E | | X |
| 3 | 5 | Comprehensive Damage Check | X | |
| 4 | 5 | Check Loaded Stores | X | |
| 5 | 5 | Establish Communications | X | |
| 6 | 5 | Checkout Operational Systems (Radar, Environmental, Electronics, etc.) | X | |

With reference to Table 1, the system operative acts may be automatically and/or manually configured as set by the system and/or user. For example, the may determine to manually remove protective covers D and E. Accordingly, the system may prompt the user (e.g., via a display of the system) to remove the covers and/or await a confirmation of the removal (or confirm removal automatically (e.g. by an image processing, RFID methods, etc.). The system may then perform a checkout of the loaded stores by, for example, confirming that the stores are secured and/or armed (e.g., via an imaging processing method, a wireless RF method, communicating with a computer of the aircraft, etc.). After completing act 1309, the process may continue to act 1323.

During act 1313, the process may perform a hot-pit refueling service upon the aircraft. Accordingly, the process may perform a plurality of service items as defined in Table 2 below.

TABLE 2

Hot-Pit Refueling Service Type-F16-B (Block 150)

| Operation Sequence | Weight (1-5) | Service Item (Operation) | Operation Mode Auto | Operation Mode Manual |
|---|---|---|---|---|
| 1 | 4 | Position Aircraft in Predetermined Location | X | |
| 2 | 4 | Open In-flight refueling door | | X |
| 3 | 5 | Turn Off anti-collision light | X | |
| 3 | 4 | Check Brake Temp (must be cool e.g. determine whether Temp < Threshold Temp) | X | |
| 4 | 4 | Pin munitions and External Tanks (if any) | X | |
| 5 | 5 | Fuel Jet | X | |

The process may use image recognition or other techniques (e.g., via communication with a computer of the aircraft being serviced, etc.) to determine whether the anti-collision light is turned off and may activate a brake cooling portion to cool the brakes, etc. After completing act 1313, the process may continue to act 1323. Further, the process may interface with maintenance records for the aircraft being serviced as well as other aircraft. Accordingly, the process may attain maintenance records as well as other information corresponding with an aircraft being serviced as well as maintenance records for other aircrafts.

During act 1317, the process may perform an ICT service upon the aircraft. Accordingly, the process may perform a plurality of service items some of which may be defined as shown in Table 3 below.

TABLE 3

Integrated Combat Turnaround Service Type-F16-B

| Operation Sequence | Weight (1-5) | Operation | Operation Mode Auto | Operation Mode Manual |
|---|---|---|---|---|
| 1 | 4 | Position Aircraft in Predetermined Location | X | |
| 2 | 4 | Check Brake Temps. | X | |
| 2 | 5 | Check Tires For Serviceability | X | |
| 2 | 4 | Comprehensive Damage Check | X | |
| 3 | 4 | Load Munitions | X | |
| 4 | 5 | Load Fuel | X | |

With reference to Table 3, certain sequence items (e.g., see, sequence items labeled 2) may refer acts which may be performed in a parallel manner by the present system rather than in a serial or sequential manner. However, it is also envisioned that these acts may be performed in a serial or sequential manner. The comprehensive damage check may determine whether the aircraft has sustained any damage any suitable method such as optical imaging techniques which may check the airframe, the engine inlets, the engine turbine (e.g., fan) blades, using one or more imagers which may be fixed and/or robotically manipulated (e.g., by the system) to capture image (or scanning) information of desired areas of the aircraft. The process may then obtain historical image information of the aircraft and employ image recognition techniques on the captured image information to determine whether the aircraft has sustained any damage. After completing act 1317, the process may continue to act 1323.

During act 1319, the process may perform a thruflight service upon the aircraft. Accordingly, the process may perform a plurality of service items as defined in Table 4 below.

TABLE 4

Thruflight Inspection Service Type-F16-B

| Operation Sequence | Weight (1-5) | Operation | Operation Mode Auto | Operation Mode Manual |
|---|---|---|---|---|
| 1 | 4 | Position Aircraft in Predetermined Location | X | |
| 2 | 4 | Comprehensive Damage Check | X | |
| 3 | 5 | Check/Service Fluid Levels and/or check/update maintenance records | X | |

After completing act 1319, the process may continue to act 1323.

With regard to acts 1309, 1311, 1315, and 1319, the process may perform a plurality of acts to service the aircraft in each of the service modes. The plurality of acts to service the aircraft may be predefined (as shown by Tables 1 through 4) and/or may be selected and/or changed by the user (e.g., in a manual mode).

During act 1323, the process may determine whether the selected service has been completed and in the affirmative, continue to act 1325. Conversely, the process may repeat 1323. The process may determine that a selected service mode has been completed when all or a number (as desired) of acts (e.g., service items or action items) in a service process (e.g., as defined by Tables 1 through 4) have been completed. Further, each act in a service mode may be weighed. For example, a fueling process may have a weight of 10 while a check of a non-essential service item may have a weight of 1. Accordingly, the process may sum up a weight of each service item (performed as compared to skipped) and compare the sum with a threshold weight (the threshold weight may be different for each service mode). Accordingly, if the process determines that the sum of the weights of the performed service items greater than or equal to the threshold value, the process may determine that the service (or a part thereof) has been completed. However, if the process determines that the sum of the weights of the performed service items less than the threshold value, the process may determine that the service has been not been completed and may repeat act 1323 while further service items may be performed and/or until a user input may be received. The weights may be predefined and/or may be set the user or the system. For example, the system may assign a weight of 10 to a fuel service item when it is determined that the aircraft may need a full load (e.g., due to range/load considerations) of fuel while the system may assign a weight of 5 to the fuel service item when it is determined that a reduced weight takeoff is preferred or the aircraft has sufficient range and/or aerial refueling is available. Thus, the system may reduce a time required to complete a service of the aircraft such as in integrated combat turnaround service, if desired. The system may also assign a critical weight to certain service items such as a weapons store loading service item such that this service item must be completed. Thus, a plurality of service items may be performed in a parallel manner (e.g., rearmament, refueling, etc.) and when a weight of the service items which are performed is greater than or equal to the threshold value, the system may determine that the service is complete, which may reduce, for example, a time required for an integrated combat turnaround process. Further, the system may determine a weight as a service item is performed (e.g., refueling).

During act 1325, the process may inform a user (e.g., via display of the system) that the service has been successfully performed. Then, the process may continue to act 1327.

During act 1327, the process may update service records related to the serviced aircraft and may then continue to act 1329, where it ends.

With reference to Tables 1 through 4 above, these tables are illustrative of exemplary acts and/or sequences which may be performed by the present system. However, other acts and/or sequences are also envisioned.

Figure 14:
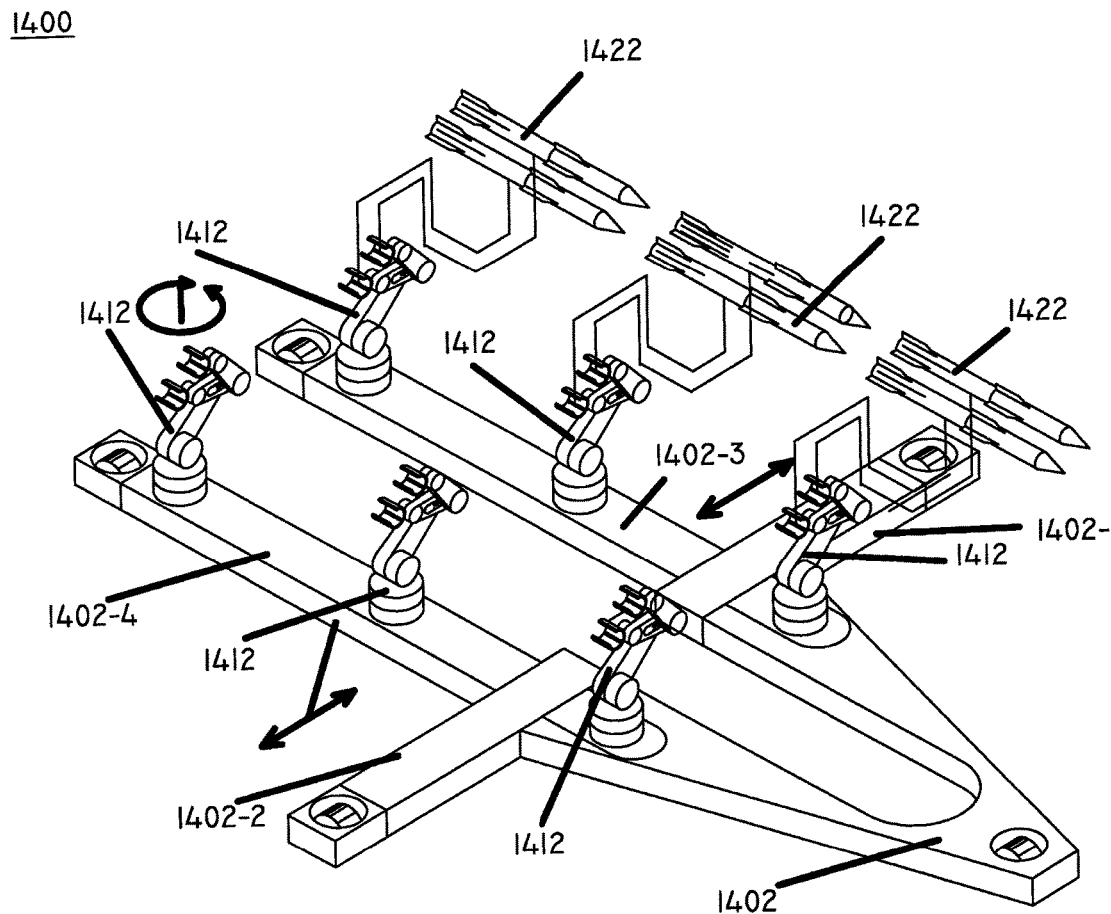
FIG. 14 is an exploded isometric view of a system according to an embodiment of the present system.

FIG. 14 is exploded isometric view of a system 1400 according to an embodiment of the present system. The system 1400 is basically similar to the system 100 and includes a base portion 1402. However, the base portion 1402 may include extensions such as extensions 1402-3 and 1402-4 and/or portions 1402-1 and 1402-2 (generally 1402-x) to which the lift portions 144 may be attached. Although separate base portions 1402-1 and 1402-2 are shown, it is envisioned that they may continuous and/or may be formed integrally with each other.

To provide mobility, the base portion 1402 may include a mobility portions such as wheels 1410, rollers, rails, tracks, floatation devices (e.g., pneumatic floatation, etc.) to enable the base portion 1402 to be easily and conveniently moved into a desired position relative to, for example, an aircraft to be serviced. However, it is also envisioned that the base portion 1402 or parts thereof may be fixedly mounted in desired position relative to a service area or pad, a store loading area or pad, a desired geophysical area, etc., which may be fixed in position or may be mobile (e.g., a turntable). Moreover, it is envisioned that the base portion 1402 may include outriggers which may stabilize the base portion 1400 during operation and which may be manually and/or automatically operated.

Figure 15:
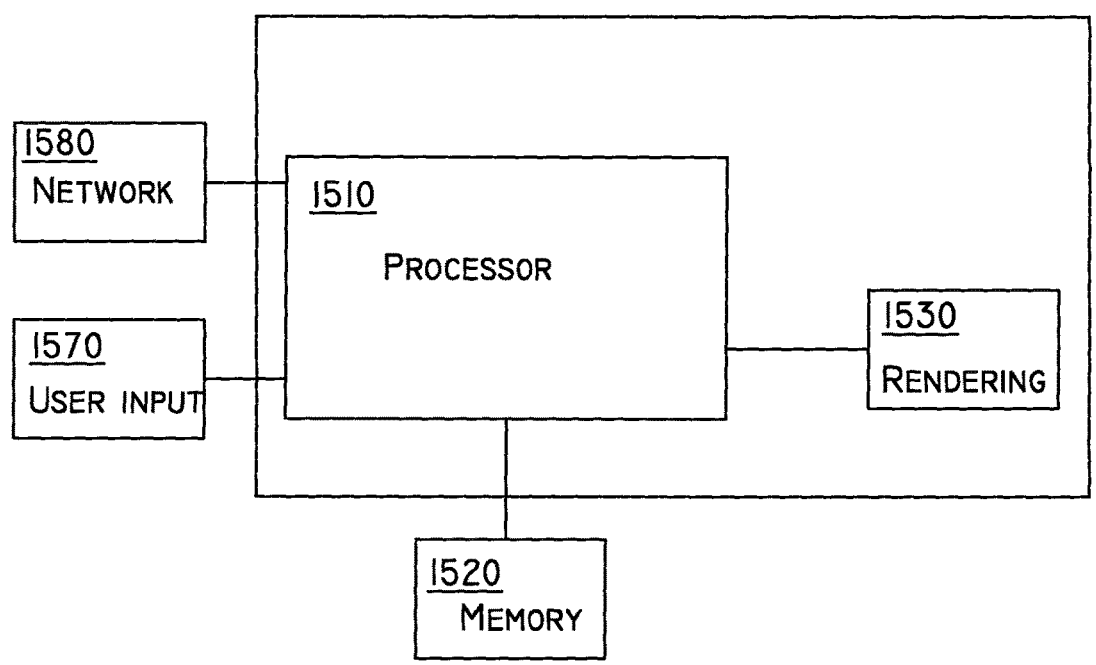
FIG. 15 is block diagram illustrating a portion of a system in accordance with an embodiment of the present system.

FIG. 15 shows a portion of a system 1500 (e.g., peer, server, etc.) in accordance with an embodiment of the present system. For example, a portion of the present system may include a processor 1510 operationally coupled to a memory 1520, a display 1530 and a user input device 1570. The memory 1520 may be any type of device for storing application data as well as other data related to the described operation. The application data and other data are received by the processor 1510 for configuring (e.g., programming) the processor 1510 to perform operation acts in accordance with the present system. The processor 1510 so configured becomes a special purpose machine particularly suited for performing in accordance with the present system.

The user input 1570 may include a keyboard, mouse, trackball or other device, including touch sensitive displays, which may be stand alone or be a part of a system, such as part of a personal computer, personal digital assistant, mobile phone, set top box, television or other device for communicating with the processor 1510 via any operable link. The user input device 1570 may be operable for interacting with the processor 1510 including enabling interaction within a UI as described herein. Clearly the processor 1510, the memory 1520, display 1530 and/or user input device 1570 may all or partly be a portion of a computer system or other device such as a client and/or server as described herein.

The methods of the present system are particularly suited to be carried out by a computer software program, such program containing modules corresponding to one or more of the individual steps or acts described and/or envisioned by the present system. Such program may of course be embodied in a computer-readable non-transitory memory medium, such as an integrated chip, a peripheral device or memory, such as the memory 1520 or other memory coupled to the processor 1510.

The program and/or program portions contained in the memory 1520 configure the processor 1510 to implement the methods, operational acts, and functions disclosed herein. The memories may be distributed, for example between the clients and/or servers, or local, and the processor 1510, where additional processors may be provided, may also be distributed or may be singular. The memories may be implemented as electrical, magnetic or optical memory, or any combination of these or other types of non-transitory storage devices. Moreover, the term "memory" should be construed broadly enough to encompass any information able to be read from or written to an address in an addressable space accessible by the processor 1510. With this definition, information accessible through a network is still within the non-transitory memory, for instance, because the processor 1510 may retrieve the information from the network for operation in accordance with the present system. For example, the memory may correspond to non-transitory memories available through a cloud computing network.

The processor 1510 is operable for providing control signals and/or performing operations in response to input signals from the user input device 1570 as well as in response to other devices of a network and executing instructions stored in the memory 1520. The processor 1510 may be an application-specific or general-use integrated circuit(s). Further, the processor 1510 may be a dedicated processor for performing in accordance with the present system or may be a general-purpose processor wherein only one of many functions operates for performing in accordance with the present system. The processor 1510 may operate utilizing a program portion, multiple program segments, or may be a hardware device utilizing a dedicated or multi-purpose integrated circuit.

It is further envisioned that the system may be integrated with various vessels such as water based vehicles such as ships (e.g., aircraft carriers, etc.), boats, barrages, landing vessels, airborne vehicles such as aircraft, ground-effect vehicles (GEVs), land-based vehicles such as trucks, aircraft tractors or tugs, lifts, trailers, all terrain vehicles (ATVs), etc. and/or combinations thereof. It is further envisioned that portions of the system may be fixedly attached to its corresponding vessel. For example, in some embodiments it is envisioned that the system may employ a robotic manipulator including a plurality of links which form a kinematic chain having a terminus including an end effector which may, for example, emulate movement of a human hand, etc. A proximal end of the kinematic chain may be attached to the vessel. The kinematic chain may include a plurality of degrees of freedom and may be controlled by actuators acting under the control of a controller. Accordingly, for example, a plurality of robotic manipulators may be stationed on, for example, a ship such as an aircraft carrier. One or more of the robotic manipulators may be operative to load stores on a corresponding aircraft under the control of one or more controllers. Accordingly, a plurality of aircraft may be loaded with stores simultaneously. Further, this loading may be performed on, for example, a flight deck (or other deck, if desired) of the aircraft carrier. Thus, an ICT may be performed on a plurality of aircraft on a deck of a carrier without having to move the aircraft from the flight deck which may conserve valuable time. Further, the robotic manipulators may be configured to move between decks or even hang from a side of a deck (e.g., the flight deck) so that available flight deck area is conserved.

Further variations of the present system would readily occur to a person of ordinary skill in the art and are encompassed by the following claims.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that: a) the word "comprising" does not exclude the presence of other elements or acts than those listed in a given claim; b) the word "a" or "an" preceding an element does not exclude the presence of a plurality of such elements; c) any reference signs in the claims do not limit their scope; di several "means" may be represented by the same item or hardware or software implemented structure or function; e) any of the disclosed elements may be comprised of hardware portions (e.g., including discrete and integrated electronic circuitry), software portions (e.g., computer programming), and any combination thereof; f) hardware portions may be comprised of one or both of analog and digital portions; g) any of the disclosed devices or portions thereof may be combined together or separated into further portions unless specifically stated otherwise; h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A device to load stores on an aircraft, comprising:
a controller configured to:
  determine a relative position of the aircraft in accordance with sensor information from at least one sensor; and
  control at least one actuator to:
    control a position of the aircraft;
    load the stores onto one or more corresponding lift portions;
    position the stores relative to the determined position of the aircraft; and
    secure the stores to the aircraft.

2. The device of claim 1, wherein the stores are secured to hardpoints (HPs) of the aircraft.

3. The device of claim 1, wherein the controller further enables an automatic store attachment mode to automatically control the at least one actuator to secure the stores to the aircraft.

4. The device of claim 1, wherein the controller is further configured to obtain requested store information (RSI) from a memory of the system, the RSI including information related to the stores.

5. The device of claim 4, wherein the controller is further configured to control the at least one actuator to automatically retrieve the stores.

6. The device of claim 1, wherein the controller is further configured to control the at least one actuator to retract the corresponding lift portions after the stores are secured.

7. The device of claim 1, wherein controller is further configured to control the at least one actuator to control one or more corresponding lift portions to provide at least one of fuel and energy to the aircraft.

8. The device of claim 1, further comprising the at least one sensor, wherein the at least one sensor comprises at least one position sensor which provides location information to the controller.

9. A method to load stores on an aircraft, the method performed by at least one controller and comprising acts of:
determining a relative position of the aircraft in accordance with sensor information; and
controlling at least one actuator to:
  control a position of the aircraft;
  load stores onto one or more corresponding lift portions;
  position the stores relative to the determined position of the aircraft; and
  secure the stores to the aircraft.

10. The method of claim 9, wherein the act of securing the stores comprises securing the stores to hardpoints (HPs) of the aircraft.

11. The method of claim 9, further comprising an act of enabling an automatic store attachment mode to automatically control the at least one actuator to secure the stores to the aircraft.

12. The method of claim 11, further comprising an act of obtaining requested store information (RSI) from a memory of the system, the RSI including information related to the stores.

13. The method of claim 12, further comprising an act of automatically controlling the at least one actuator to retrieve the stores.

14. The method of claim 9, further comprising an act of controlling the at least one actuator to retract the corresponding lift portions after the stores are secured.

15. The method of claim 9, further comprising an act of controlling the at least one actuator to control one or more corresponding lift portions to provide at least one of fuel and energy to the aircraft.

16. The method of claim 9, further comprising an act of obtaining location information from at least one position sensor.

17. A device to load stores on an aircraft, comprising:

a flight deck to receive an aircraft; and at least one lift portion configured to receive the stores; and a controller which is configured to control at least one actuator to:

control the at least one lift portion to position the received stores relative to the aircraft, and secure the stores to the aircraft.

18. The device of claim 17, wherein the device is further configured to provide fuel or energy to the aircraft.

19. The device of claim 17, wherein the at least one lift portion may be placed at a first level different from the flight deck to load the received the stores.

20. The device of claim 19, wherein the at least one lift portion may be raised to another level different from the first level to service the aircraft.

* * * * *